(12) United States Patent
Bai et al.

(10) Patent No.: US 12,464,471 B2
(45) Date of Patent: Nov. 4, 2025

(54) TECHNIQUES FOR FLEXIBLE CONFIGURATION OF POWER CONTROL PARAMETERS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 870 days.

(21) Appl. No.: 17/684,120

(22) Filed: Mar. 1, 2022

(65) Prior Publication Data

US 2023/0309021 A1    Sep. 28, 2023

(51) Int. Cl.
*H04W 52/14* (2009.01)
*H04L 5/00* (2006.01)

(52) U.S. Cl.
CPC ......... *H04W 52/146* (2013.01); *H04L 5/0048* (2013.01)

(58) Field of Classification Search
CPC ............. H04W 52/146; H04W 52/325; H04L 5/0048; H04B 7/06952
See application file for complete search history.

(56) References Cited

U.S. PATENT DOCUMENTS

| 11,895,681 B2* | 2/2024 | Farag | H04B 7/0404 |
| 2019/0124598 A1* | 4/2019 | Fakoorian | H04L 5/0035 |

(Continued)

FOREIGN PATENT DOCUMENTS

| WO | WO-2021147001 A1 | 7/2021 |
| WO | WO-2021174526 A1 | 9/2021 |

OTHER PUBLICATIONS

3GPP TS 38.331: "3rd Generation Partnership Project, Technical Specification Group Radio Access Network, NR, Radio Resource Control (RRC) protocol specification (Release 15)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V15.8.0, (Dec. 2019), Jan. 8, 2020, pp. 1-529, XP051860598, p. 378-382.

(Continued)

*Primary Examiner* — Jinsong Hu
*Assistant Examiner* — Rui M Hu
(74) *Attorney, Agent, or Firm* — Dalei Dong; Holland & Hart LLP

(57) ABSTRACT

Techniques and devices for wireless communications are described. A user equipment (UE) may receive a first message indicating a first configuration for a set of resources for transmitting reference signals. The first configuration may include a first indication of a first set of power control parameters corresponding to the set of resources and a second indication of a set of transmission configuration indicator (TCI) states. The UE may receive a second message indicating a second configuration for the set of TCI states. The second configuration may include a third indication of a second set of power control parameters corresponding to the set of TCI states. The UE may transmit the reference signals in accordance with the first set of power control parameters or the second set of power control parameters.

30 Claims, 17 Drawing Sheets

(56) References Cited

U.S. PATENT DOCUMENTS

| | | | |
|---|---|---|---|
| 2022/0216929 A1* | 7/2022 | Matsumura | H04L 5/0023 |
| 2022/0330167 A1* | 10/2022 | Chen | H04W 52/42 |
| 2022/0345272 A1* | 10/2022 | Guo | H04W 72/20 |
| 2023/0094601 A1* | 3/2023 | Xu | H04W 52/08 |
| | | | 370/318 |
| 2023/0097691 A1* | 3/2023 | Zhang | H04W 52/08 |
| | | | 455/522 |
| 2023/0239096 A1* | 7/2023 | Go | H04L 5/0098 |
| | | | 370/329 |
| 2023/0262608 A1* | 8/2023 | Gao | H04W 52/08 |
| | | | 455/522 |
| 2023/0284149 A1* | 9/2023 | Zhu | H04W 16/28 |
| | | | 370/318 |
| 2023/0292250 A1* | 9/2023 | Määttänen | H04W 52/242 |
| 2023/0397125 A1* | 12/2023 | Xu | H04W 52/42 |
| 2023/0403570 A1* | 12/2023 | Li | H04L 5/0035 |
| 2024/0049143 A1* | 2/2024 | Yuan | H04W 52/325 |
| 2024/0056268 A1* | 2/2024 | Cirik | H04L 5/0091 |
| 2024/0129858 A1* | 4/2024 | Matsumura | H04W 52/242 |
| 2024/0155433 A1* | 5/2024 | Zhang | H04W 72/542 |
| 2024/0155503 A1* | 5/2024 | Wang | H04W 52/242 |
| 2024/0171353 A1* | 5/2024 | Yang | H04B 7/00 |
| 2024/0172317 A1* | 5/2024 | Cirik | H04L 5/0091 |
| 2024/0214947 A1* | 6/2024 | Park | H04L 5/0053 |
| 2024/0215019 A1* | 6/2024 | Gao | H04W 52/146 |
| 2024/0235761 A1* | 7/2024 | Yang | H04W 52/146 |
| 2024/0259950 A1* | 8/2024 | Nilsson | H04W 52/42 |
| 2024/0306099 A1* | 9/2024 | MolavianJazi | H04W 52/367 |
| 2025/0158780 A1* | 5/2025 | Cirik | H04L 5/0048 |
| 2025/0175908 A1* | 5/2025 | Yi | H04W 72/046 |

OTHER PUBLICATIONS

International Search Report and Written Opinion—PCT/US2023/062040—ISA/EPO—Jun. 14, 2023.

Samsung: "Maintenance on Rel-17 Multi-Beam", 3GPP TSG RAN WG1 #108-e, R1-2201996, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, XP052109926, Feb. 14, 2022, pp. 1-9, section 2.2.

* cited by examiner

TECHNIQUES FOR FLEXIBLE CONFIGURATION OF POWER CONTROL PARAMETERS

FIELD OF DISCLOSURE

The following relates to wireless communications, including techniques for flexible configuration of power control parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support uplink power control procedures for determining a transmit power associated with uplink channels. Some techniques for uplink power control may be prohibitive, and rigid.

SUMMARY

The described techniques relate to improved techniques, devices, and apparatuses that support techniques for flexible configuration of power control parameters. For example, the described techniques provide one or more enhancements for uplink power control in a wireless communications system. For example, a communication device may receive a first message indicating a first configuration for a set of resources for transmitting reference signals. In some examples, the first configuration may include a first indication of a first set of power control parameters corresponding to the set of resources and a second indication of a set of transmission configuration indicator (TCI) states. In some examples, each TCI state of the set of TCI states may be associated with a respective resource of the set of resources. The communication device may receive a second message indicating a second configuration for the set of TCI states. In some examples, the second configuration may include a third indication of a second set of power control parameters corresponding to the set of TCI states. The communication device may transmit the reference signals in accordance with a determined set of power control parameters. The determined set of power control parameters may include the first set of power control parameters or the second set of power control parameters. The present disclosure may therefore promote improved communication reliability and improved coordination between devices, among other benefits.

A method for wireless communication at a user equipment (UE) is described. The method may include receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, receiving a second message indicating a second configuration for the set of TCI states, the second configuration including a third indication of a second set of power control parameters corresponding to the set of TCI states, and transmitting the reference signals in accordance with a determined set of power control parameters, the determined set of power control parameters including the first set of power control parameters or the second set of power control parameters.

An apparatus for wireless communication at a UE is described. The apparatus may include a processor, memory coupled with the processor, and instructions stored in the memory. The instructions may be executable by the processor to cause the apparatus to receive a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, receive a second message indicating a second configuration for the set of TCI states, the second configuration including a third indication of a second set of power control parameters corresponding to the set of TCI states, and transmit the reference signals in accordance with a determined set of power control parameters, the determined set of power control parameters including the first set of power control parameters or the second set of power control parameters.

Another apparatus for wireless communication at a UE is described. The apparatus may include means for receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, means for receiving a second message indicating a second configuration for the set of TCI states, the second configuration including a third indication of a second set of power control parameters corresponding to the set of TCI states, and means for transmitting the reference signals in accordance with a determined set of power control parameters, the determined set of power control parameters including the first set of power control parameters or the second set of power control parameters.

A non-transitory computer-readable medium storing code for wireless communication at a UE is described. The code may include instructions executable by a processor to receive a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, receive a second message indicating a second configuration for the set of TCI states, the second configuration including a third indication of a second set of power control parameters corresponding to the set of TCI states, and transmit the reference signals in accordance with a determined set of power control parameters, the determined set of power control parameters including the first set of power control parameters or the second set of power control parameters.

Some examples of the method, apparatuses, and non-transitory computer-readable medium described herein may further include operations, features, means, or instructions for determining, based on the received second message, that each TCI state of the set of TCI states corresponds to a respective subset of power control parameters included in the second set of power control parameters, where the determined set of power control parameters may be the second set of power control parameters based on the determination.

Some examples of the method, apparatuses, and non-transitory computer-readable medium described herein may further include operations, features, means, or instructions for determining, based on the received first message, that the set of resources for transmitting the reference signals corresponds to a set of power control parameters, where the determined set of power control parameters may be the first set of power control parameters based on the determination.

Some examples of the method, apparatuses, and non-transitory computer-readable medium described herein may further include operations, features, means, or instructions for receiving a third message indicating that the set of resources for transmitting the reference signals may be configured for a beam management procedure, where the determined set of power control parameters may be the first set of power control parameters based on the received third message.

Some examples of the method, apparatuses, and non-transitory computer-readable medium described herein may further include operations, features, means, or instructions for receiving a third message indicating that the set of resources for transmitting the reference signals may be configured for codebook or non-codebook transmissions, where the determined set of power control parameters may be the second set of power control parameters based on the received third message.

Some examples of the method, apparatuses, and non-transitory computer-readable medium described herein may further include operations, features, means, or instructions for receiving a third message indicating that the set of TCI states may be different from TCI states associated with a set of dedicated resources for transmitting uplink shared channel transmissions and determining, based on the received third message, that the second set of power control parameters may be a common set of power control parameters corresponding to each resource of the set of resources, where the common set of power control parameters may be based on a TCI state associated with a resources of the set of resources for transmitting the reference signals, and where the determined set of power control parameters may be the second set of power control parameters based on the determination.

In some examples of the method, apparatuses, and non-transitory computer-readable medium described herein, the common set of power control parameters may be further based on an identifier of the resources of the set of resources.

Some examples of the method, apparatuses, and non-transitory computer-readable medium described herein may further include operations, features, means, or instructions for receiving a third message indicating a third configuration for the UE to transmit the reference signals according to the first set of power control parameters or the second set of power control parameters, where transmitting the reference signals in accordance with the determined set of power control parameters may be based on the third configuration.

Some examples of the method, apparatuses, and non-transitory computer-readable medium described herein may further include operations, features, means, or instructions for receiving a fourth message indicating an update to the third configuration, where transmitting the reference signals in accordance with the determined set of power control parameters may be further based on the update to the third configuration.

In some examples of the method, apparatuses, and non-transitory computer-readable medium described herein, the third message may be a radio resource control (RRC) message and the fourth message may be a downlink control information (DCI) message or a medium access control control element (MAC-CE).

Some examples of the method, apparatuses, and non-transitory computer-readable medium described herein may further include operations, features, means, or instructions for identifying a default configuration for transmitting the reference signals, where the default configuration indicates for the UE to transmit the reference signals in accordance with the first set of power control parameters or the second set of power control parameters, and where transmitting the reference signals in accordance with the determined set of power control parameters may be based on the identified default configuration.

Some examples of the method, apparatuses, and non-transitory computer-readable medium described herein may further include operations, features, means, or instructions for receiving a third message indicating the default configuration for transmitting the reference signals, where identifying the default configuration may be based on the received third message.

In some examples of the method, apparatuses, and non-transitory computer-readable medium described herein, the default configuration may be configured at the UE.

In some examples of the method, apparatuses, and non-transitory computer-readable medium described herein, the first configuration further includes a fourth indication of a set of multiple subsets of power control parameters and each subset of the set of multiple subsets corresponds to a resource of the set of resources.

Some examples of the method, apparatuses, and non-transitory computer-readable medium described herein may further include operations, features, means, or instructions for determining that the first set of power control parameters may be a common set of power control parameters corresponding to each resource of the set of resources, based on an indication of a subset of power control parameters corresponding to each resource of the set of resources being absent from the first configuration.

Some examples of the method, apparatuses, and non-transitory computer-readable medium described herein may further include operations, features, means, or instructions for transmitting a report indicating at least one UE capability associated with controlling a transmit power at the UE, where receiving the first message, the second message, or both, may be based on the at least one UE capability.

In some examples of the method, apparatuses, and non-transitory computer-readable medium described herein, the at least one UE capability includes a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

A method for wireless communication at a network entity is described. The method may include outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, outputting a second message indicating a second configuration for the set of TCI states, the second configuration including a third indication of a second set of power control parameters corresponding to the set of TCI states, and obtaining the reference signals in accordance with a determined set of power control parameters, the determined set of power control parameters including the first set of power control parameters or the second set of power control parameters.

An apparatus for wireless communication at a network entity is described. The apparatus may include a processor, memory coupled with the processor, and instructions stored in the memory. The instructions may be executable by the processor to cause the apparatus to output a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, output a second message indicating a second configuration for the set of TCI states, the second configuration including a third indication of a second set of power control parameters corresponding to the set of TCI states, and obtain the reference signals in accordance with a determined set of power control parameters, the determined set of power control parameters including the first set of power control parameters or the second set of power control parameters.

Another apparatus for wireless communication at a network entity is described. The apparatus may include means for outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, means for outputting a second message indicating a second configuration for the set of TCI states, the second configuration including a third indication of a second set of power control parameters corresponding to the set of TCI states, and means for obtaining the reference signals in accordance with a determined set of power control parameters, the determined set of power control parameters including the first set of power control parameters or the second set of power control parameters.

A non-transitory computer-readable medium storing code for wireless communication at a network entity is described. The code may include instructions executable by a processor to output a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources, output a second message indicating a second configuration for the set of TCI states, the second configuration including a third indication of a second set of power control parameters corresponding to the set of TCI states, and obtain the reference signals in accordance with a determined set of power control parameters, the determined set of power control parameters including the first set of power control parameters or the second set of power control parameters.

In some examples of the method, apparatuses, and non-transitory computer-readable medium described herein, the determined set of power control parameters may be the second set of power control parameters based on each TCI state of the set of TCI states corresponding to a respective subset of power control parameters included in the second set of power control parameters.

In some examples of the method, apparatuses, and non-transitory computer-readable medium described herein, the determined set of power control parameters may be the first set of power control parameters based on the set of resources for transmitting the reference signals corresponding to a set of power control parameters.

Some examples of the method, apparatuses, and non-transitory computer-readable medium described herein may further include operations, features, means, or instructions for outputting a third message indicating that the set of resources for transmitting the reference signals may be configured for a beam management procedure, where the determined set of power control parameters may be the first set of power control parameters based on outputting the third message.

Some examples of the method, apparatuses, and non-transitory computer-readable medium described herein may further include operations, features, means, or instructions for outputting a third message indicating that the set of resources for transmitting the reference signals may be configured for codebook or non-codebook transmissions, where the determined set of power control parameters may be the second set of power control parameters based on outputting the third message.

Some examples of the method, apparatuses, and non-transitory computer-readable medium described herein may further include operations, features, means, or instructions for outputting a third message indicating a third configuration for the reference signals to be transmitted according to the first set of power control parameters or the second set of power control parameters, where obtaining the reference signals in accordance with the determined set of power control parameters may be based on the third configuration.

Some examples of the method, apparatuses, and non-transitory computer-readable medium described herein may further include operations, features, means, or instructions for outputting a fourth message indicating an update to the third configuration, where obtaining the reference signals in accordance with the determined set of power control parameters may be further based on the update to the third configuration.

In some examples of the method, apparatuses, and non-transitory computer-readable medium described herein, the third message may be an RRC message and the fourth message may be a DCI message or a MAC-CE.

Some examples of the method, apparatuses, and non-transitory computer-readable medium described herein may further include operations, features, means, or instructions for outputting a third message indicating a default configuration for transmitting the reference signals, where the default configuration indicates for the reference signals to be transmitted in accordance with the first set of power control parameters or the second set of power control parameters, and where obtaining the reference signals in accordance with the determined set of power control parameters may be based on outputting the third message.

In some examples of the method, apparatuses, and non-transitory computer-readable medium described herein, the first configuration further includes a fourth indication of a set of multiple subsets of power control parameters and each subset of the set of multiple subsets corresponds to a resource of the set of resources.

In some examples of the method, apparatuses, and non-transitory computer-readable medium described herein, the first set of power control parameters may be a common set of power control parameters corresponding to each resource of the set of resources.

Some examples of the method, apparatuses, and non-transitory computer-readable medium described herein may further include operations, features, means, or instructions for obtaining a report indicating at least one UE capability associated with controlling a transmit power at a UE, where outputting the first message, the second message, or both, may be based on the at least one UE capability.

In some examples of the method, apparatuses, and non-transitory computer-readable medium described herein, the at least one UE capability includes a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

DETAILED DESCRIPTION

Figure 1:
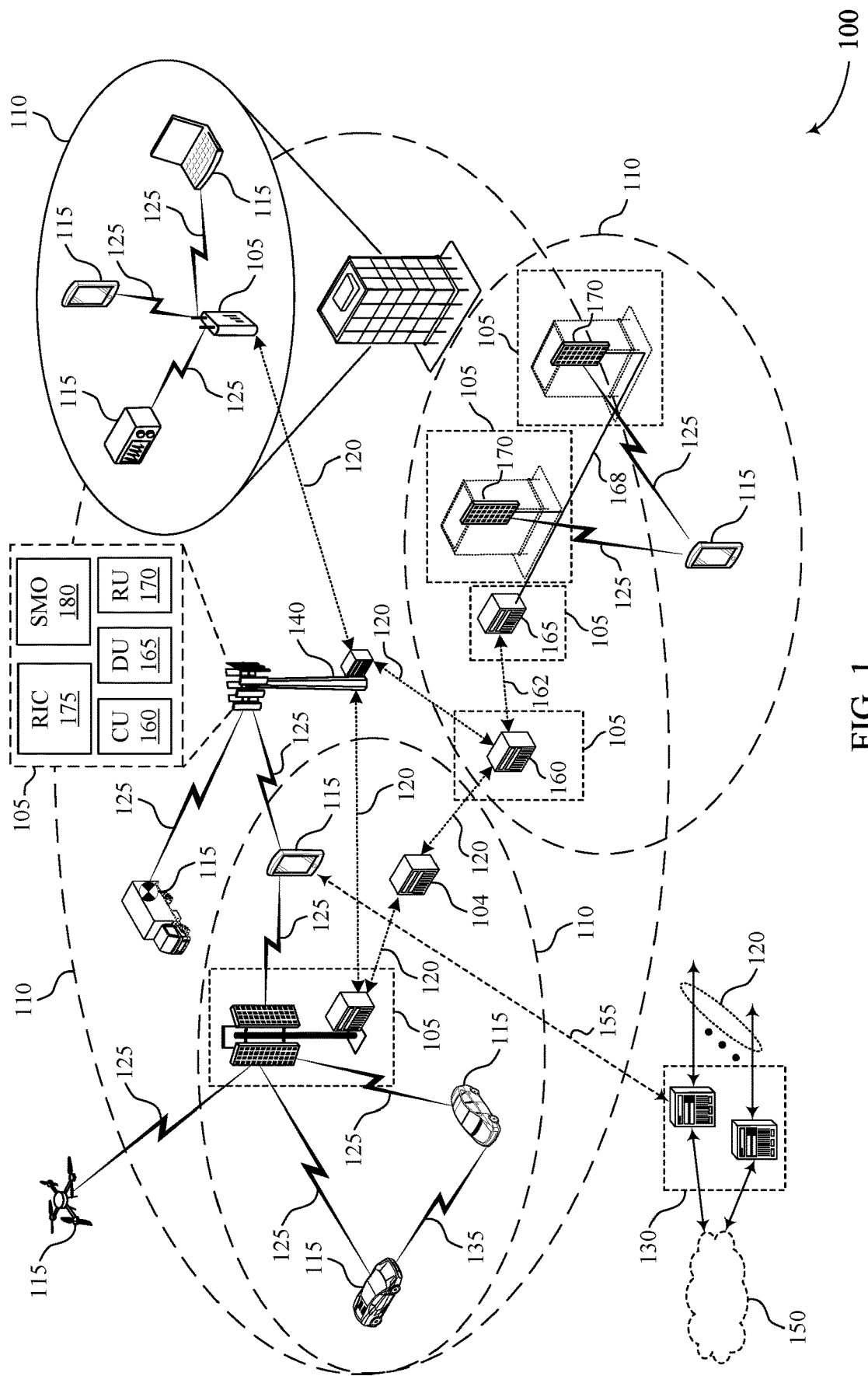
FIGS. 1 and 2 may each illustrate an example of a wireless communications system that supports techniques for flexible configuration of power control parameters in accordance with various aspects of the present disclosure.

Some wireless communications systems may support beamforming operations for directional communications. For example, wireless communication devices operating within a wireless communications system may communicate via directional transmissions (e.g., beams), in which beamforming may be applied (e.g., using one or more antenna elements) to form a beam in a direction. Beamforming involves a signal processing technique in which a transmitting communication device, or a receiving communication device, or both, select, shape, or steer an antenna beam (e.g., a directional beam) along a spatial path between the two communication devices (e.g., between a network entity and a user equipment (UE)). For example, a first communication device (e.g., the UE) may apply beamforming to form one or more beams (e.g., one or more uplink transmit beam or one or more downlink receive beam) for communications with a second communication device (e.g., the network entity).

In some wireless communications, a wireless communications network (e.g., the network entity) may utilize an uplink power control procedure for determining a transmit power associated with the one or more uplink transmit beams (or one or more uplink channels). In some examples of uplink power control, the network may configure the first communication device (e.g., the UE) with one or more power control parameters (or one or more sets of power control parameters) to be used for transmitting uplink signals (e.g., uplink reference signals) to the second communication device (e.g., the network entity) via one or more uplink transmit beams. In some examples, the network may configure the first communication device with power control parameters that correspond to a transmission configuration indicator (TCI) state and, accordingly, a beamforming direction associated with the TCI state. For example, the network may utilize a TCI states to indicate a beamforming direction (e.g., an uplink transmit beam) for transmitting the uplink reference signals to the second communication device. In some examples, the TCI state may indicate a quasi co-location relationship, such as between two signals (e.g., reference signals) or a signal and an antenna port, that the first communication device may use to determine the uplink transmit beam for transmitting the uplink reference signals to the second communication device.

In some examples, the network may activate or update a common TCI state (e.g., a common TCI state configuration) for multiple component carriers in a component carrier list (e.g., a component carrier list configured at the first communication device). Additionally, or alternatively, a number of component carrier lists (e.g., a maximum number or an otherwise suitable number of component carrier lists) in a cell group may be determined (e.g., predefined, defined, preconfigured, configured) at the first communication device. Additionally, or alternatively, the first communication device may report, to the network, a number of component carrier lists (e.g., a maximum number or an otherwise suitable number of component carrier lists) in that the first communication device may be capable of supporting. For example, the first communication device may report the number of component carrier lists to the network as a capability of the first communication device (e.g., a UE capability in a UE capability report).

In some examples, the network may indicate a TCI state for multiple communication channels configured for use by the first communication device (e.g., dedicated channels, dedicated data channels). In some instances, based on one or more capabilities of the first communication device (e.g., indicated to the network via the UE capability report), the first communication device may receive (e.g., optionally support) an indication, for example via dynamic signaling by the network (e.g., in a radio resource control (RRC) message or a medium access control control element (MAC-CE)), of whether a resource of another communication channel (e.g., a channel not dedicated for use by the first communication device, a non-dedicated channel) or a reference signal may share a TCI state (e.g., a same TCI state) with one or more of the multiple dedicated channels. Additionally, or alternatively, if the first communication device fails to report (e.g., or is not capable of supporting) a capability of the first communication device to receive such an indication, a default rule may be applied to determine a TCI state for the non-dedicated channel (e.g., the resource of the non-dedicated channel) or the reference signal. In some examples, the default rule may be such that the TCI state indicated for the dedicated channels may be applied to the resource of the non-dedicated channel or the reference signal. Additionally, or alternatively, the first communication device may report whether the first communication device supports configuration, by the network, of a control resource set (CORESET) associated with both dedicated channels and non-dedicated channels (e.g., non-dedicated downlink control channels and the respective non-dedicated downlink data channels). In some examples, such a capability may apply to multiple (e.g., any) CORESET. In other examples, such a capability may not apply to a first CORESET (e.g., a CORESET associated with an index of 0) in either an intra-cell beam management procedure or another procedure that may include an inter-cell beam management procedure.

In some examples, the network may configure the first communication device with multiple sets (e.g., subsets) of power control parameters that each correspond to a respective TCI state. In such an example, the first communication device may apply the multiple sets of power control parameters, such that a transmit power used by the first communication device to transmit the uplink reference signals may change across multiple (e.g., different) beamforming directions. However, in some examples, the uplink reference signals may be transmitted by the first communication device a part of a beam management procedure, such that the second communication device may identify a beam pair for communications with the first communication device. In such an example, changes in the uplink transmit power across multiple directions may result in inaccuracies and degrade the reliability of the beam management procedure.

Additionally, or alternatively, the network may configure the first communication device with a common (e.g., same) set of power control parameters to be applied across the multiple beamforming directions. That is, the network may configure the first communication device with power control parameters that are independent of a TCI state. For example, the network may configure the first communication device with power control parameters that correspond to a set of resources for transmitting the uplink reference signals. In some examples, however, the first communication device may not be capable of determining whether to apply the power control parameters associated with a TCI state or power control parameters that are independent of a TCI state.

Various aspects of the present disclosure relate to techniques for flexible configuration of power control parameters, and more specifically, to criteria (e.g., rules) for determining whether to apply power control parameters that depend on a TCI state or power control parameters that are independent of a TCI state for uplink reference signal transmissions. For example, the network (e.g., one or more network entities) may configure the first communication device with multiple sets of power control parameters that may include power control parameters which depend on a TCI state (e.g., TCI state-dependent power control parameters) and power control parameters which depend on one or multiple resources for transmitting the uplink reference signals (e.g., TCI state-independent power control parameters). In some examples, the network may configure the first communication device to apply the TCI state-dependent power control parameters and refrain from applying TCI state-independent power control parameters. In other examples, the network may configure the first communication device to apply the TCI state-independent power control parameters and refrain from applying TCI state-dependent power control parameters. Additionally, or alternatively, the network may configure the first communication device to determine whether to apply the TCI state-dependent power control parameters or the TCI state-independent power control parameters based on a use (e.g., intended use) of the uplink reference signals or signaling (e.g., dynamic signaling) from the network. Additionally, or alternatively, the network may configure the first communication device to apply a default configuration for controlling the transmit power, for example if the TCI state-dependent power control parameters and the TCI-independent power control parameters are not configured for the first communication device.

Aspects of the subject matter described herein may be implemented to realize one or more of the following potential advantages. For example, the techniques employed by the described communication devices may provide benefits and enhancements to the operation of the communication devices, including enabling flexible configuration of power control parameters for transmitting uplink reference signals. In some examples, operations performed by the described communication devices may provide improvements to the reliability of communications within a wireless communications system. In some examples, the operations performed by the described communication devices to improve communication reliability within the wireless communications system may include configuring a communication device with criteria for determining whether to apply TCI state-dependent power control parameters or TCI state-independent power control parameters for uplink reference signal transmissions. In some other examples, operations performed by the described communication devices may also support increased throughput and higher data rates, among other benefits.

Aspects of the disclosure are initially described in the context of wireless communications systems. Aspects of the disclosure are further illustrated by and described with reference to a process flow, apparatus diagrams, system diagrams, and flowcharts that relate to techniques for flexible configuration of power control parameters.

FIG. 1 illustrates an example of a wireless communications system 100 that supports techniques for flexible configuration of power control parameters in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for flexible configuration of power control parameters as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\alpha f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, techniques for flexible configuration of power control parameters that may provide one or more enhancements for uplink power control in the wireless communications system 100. For example, a communication device (e.g., a UE 115) may receive a first message indicating a first configuration for a set of resources for transmitting reference signals. In some examples, the first configuration may include a first indication of a first set of power control parameters corresponding to the set of resources and a second indication of a set of TCI states. In some examples, each TCI state of the set of TCI states may be associated with a respective resource of the set of resources. The UE 115 may receive a second message indicating a second configuration for the set of TCI states. In some examples, the second configuration may include a third indication of a second set of power control parameters corresponding to the set of TCI states. The UE 115 may transmit the reference signals in accordance with a determined set of power control parameters. The determined set of power control parameters may include the first set of power control parameters or the second set of power control parameters. As a result, the UE 115 improve the reliability of communications between the UE 115 may the network.

Figure 2:
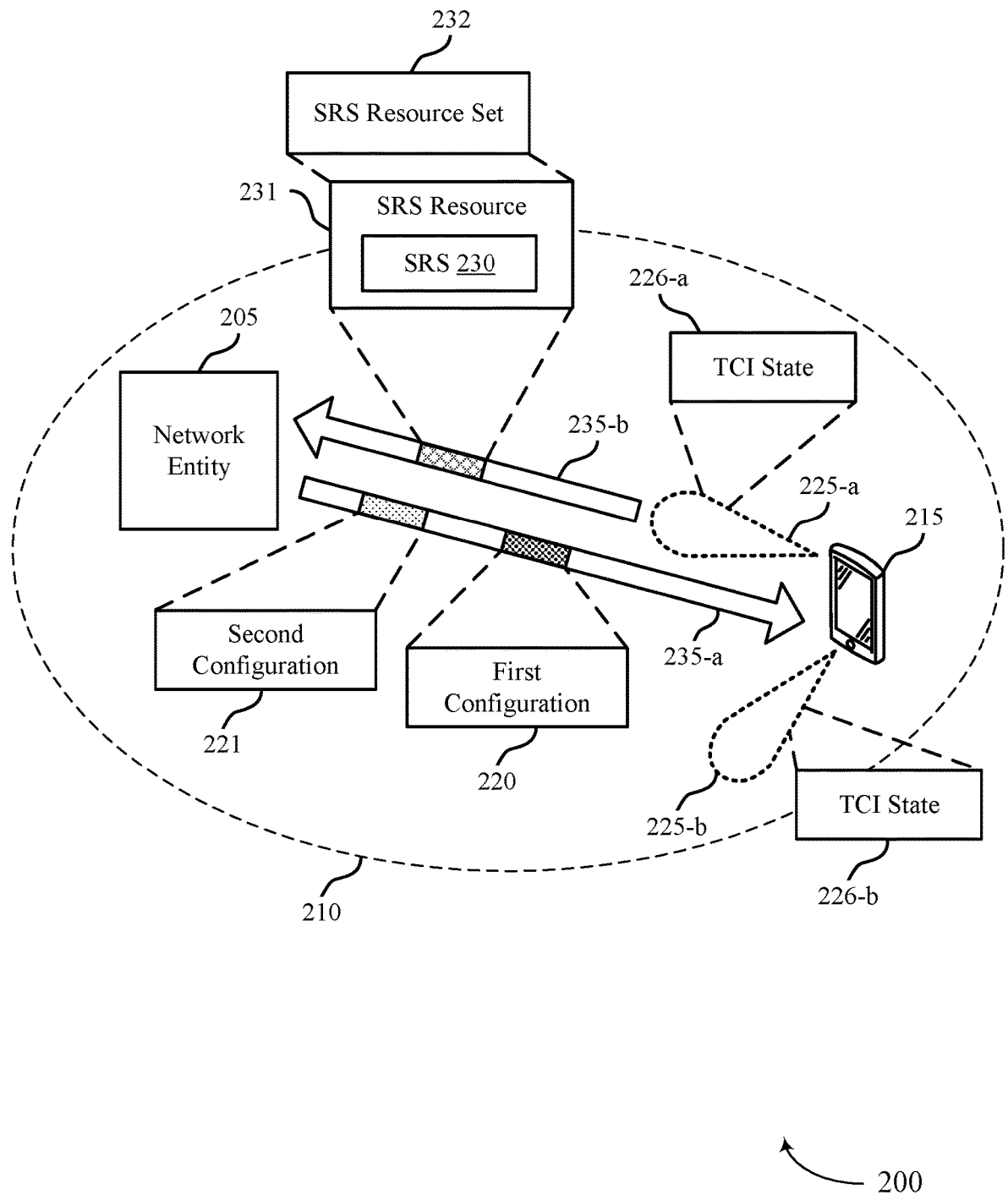

FIG. 2 illustrates an example of a wireless communications system 200 that supports techniques for flexible configuration of power control parameters in accordance with various aspects of the present disclosure. The wireless communications system 200 may implement or be implemented by one or more aspects of the wireless communications system 100. For example, the wireless communications system 200 may include a network entity 205 and a UE 215, which may be examples of the corresponding devices as described with reference to FIG. 1. In the example of FIG. 2, the network entity 205 may be an example of a base station 140, a CU 160, a DU 165, or an RU 170 as described with reference to FIG. 1. The network entity 205 and the UE 215 may communicate within a coverage area 210 which may be an example of a coverage area 110 as described with reference to FIG. 1. Additionally, or alternatively, the network entity 205 and the UE 215 may communicate over one or more communication links 235 (e.g., a communication link 235-a and a communication link 235-b), which may be examples of a communication link 125, as described with reference to FIG. 1. In the example of FIG. 2, the communication link 235-a may be an example of a downlink and the communication link 235-b may be an example of an uplink.

In some examples, the UE 215 may use beamforming to communicate using one or more beams 225 (e.g., a beam 225-a and a beam 225-b). For example, the UE 215 may use the beam 225-a to communicate over the communication link 235-b. In some examples, the UE 215 may switch beams 225 or steer beams 225 to communicate in different directions. For example, the UE 215 may use the beam 225-a to transmit or receive communications along one spatial path and the beam 225-b (e.g., or one or more other beams 225, not shown) to transmit or receive communications along another spatial path. In some examples, each beam 225 may be associated with a respective TCI state 226 (e.g., a TCI state 226-a or a TCI state 226-b). For example, the beam 225-a may be associated with the TCI state 226-a and the beam 225-b may be associated with TCI state 226-b. In some examples, the beamforming direction of a beam (e.g., the beam 225-a, the beam 225-b) may be based on (e.g., correspond to) the associated TCI state.

The wireless communications system 200 may support power management techniques in which a network (e.g., one or more network entities 205) may configure the UE 215 with power control parameters (e.g., uplink power control parameters) for transmitting uplink communications, such as uplink reference signals. For example, the network entity 205 may configure the UE 215 with one or multiple sets of power control parameters for controlling the transmit power (e.g., in decibel milliwatts (dBm)) used by the UE 215 for transmitting uplink reference signals, such as sounding reference signals (SRSs), to the network entity 205. That is, the UE 215 determining a transmit power ($P_{SRS,b,f,c}(i, q_s, l)$) for transmitting an SRS 230 (e.g., and one or more other SRSs 230, not shown) based on the set of power control parameters indicated to the UE 215 by the network entity 205. In some examples, the network may configure the UE 215 with an SRS resource 231 (e.g., and one or more other SRS resources 231, not shown) for transmitting the SRS 230. For example, the network may configure the UE 215 with an SRS resource set 232 that may include the SRS resources 231 (e.g., and the one or more other SRS resources 231, not shown). In some examples, to transmit one or multiple SRSs, such as the SRS 230, the UE 215 may divide a value (e.g., a linear value) of the transmit power ($P_{SRS,b,f,c}(i, q_s, l)$) between (e.g., equally across) antenna ports at the UE 215 (e.g., antenna ports at the UE 215 configured for transmitting the SRS 230 and one or more other SRSs 230 (not shown)).

In some examples, the UE 215 may determine the transmit power ($P_{SRS,b,f,c}(i, q_s, l)$) using an SRS power control adjustment state (e.g., with an index (l)) in an SRS in accordance with the following Equation 1:

$$P_{SRS,b,f,c}(i, q_s, l) = \min \left\{ \begin{array}{c} P_{CMAX,f,c(i)} \\ P_{O_{SRS},b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [dBm] \quad (1)$$

where $P_{CMAX,f,c(i)}$ may represent a threshold transmit power (e.g., a maximum output power or an otherwise suitable output power) for a carrier frequency (f) of a serving cell (c) in an SRS transmission occasion (i). In some examples, $P_{CMAX,f,c(i)}$ may be determined (e.g., fixed, configured) for the UE 215. Additionally, or alternatively, $P_{O_{SRS},b,f,c}(q_s)$ may represent a value of a transmit power for a carrier frequency (f) of a serving cell (c) and SRS resource set ($q_s$), such as the SRS resource set 232, in an SRS transmission occasion (i). In some examples, $P_{O_{SRS},b,f,c}(q_s)$ may be and intercept of $P_{CMAX,f,c(i)}$ provided (e.g., indicated) to the UE 215 via an information element (IE), such as the SRS-ResourceSet IE or the SRS-ResourceSetId IE.

Additionally, or alternatively, $M_{SRS,b,f,c}(i)$ may represent a parameter associated with a bandwidth (e.g., an active bandwidth part) configured for transmitting the SRS 230. For example, as the bandwidth configured for transmitting reference signals (e.g., the SRS 230 and one or more other SRSs 230 (not shown)) increases, the noise associated with transmitting the reference signals may also increase. As such, the UE 215 may increase the transmit power for increased values of $M_{SRS,b,f,c}(i)$. Additionally, or alternatively, $PL_{b,f,c}(qa_d)$ may represent an estimated pathloss (e.g., a downlink pathloss estimate) calculated by the UE 215 using a reference signal resource index ($q_d$). Additionally, or alternatively, $\alpha_{SRS,b,f,c}(q_s)$ may represent a fraction of the pathloss ($PL_{b,f,c}(q_d)$) that the UE 215 may be capable of compensating for.

In some examples, the network entity 205 may configure the UE 215 to measure the pathloss for a number of reference signals (e.g., downlink reference signals corresponding to each TCI state or each SRS resource included in the SRS resource set 232). For example, that network entity 205 may configure the UE 215 to determine the pathloss for multiple TCI state configured for the UE 215. In some examples, the UE 215 may measure the pathloss for a downlink beam (e.g., associated with a TCI state) via a downlink reference signal and may compute the pathloss for the corresponding uplink beam (e.g., associated with the same TCI state) based on the downlink beam pathloss measurement. For example, the UE 215 calculate a pathloss for the beam 225-a (e.g., an uplink beam) based on one or more pathloss measurements performed using a downlink beam with a same TCI state (e.g., the TCI state 226-a).

In some examples, the UE 215 may adjust the uplink transmit power to compensate for the calculated pathloss ($PL_{b,f,c}(q_d)$), such that uplink transmissions from multiple UEs (e.g., the UE 215 and one or more other UEs 215 (not shown)) may be received by the network entity 205 at a same power level (e.g., about the same power level). Additionally, or alternatively, $h_{b,f,c}(i, l)$ may represent a closed loop index (e.g., an adjustment term) that may be controlled by the network entity 205 (e.g., used by the network entity 205 to increase or decrease the transmit power). For example, the network entity may indicate an adjustment (e.g., a relatively small adjustment, a step) to the value of the transmit power at the UE 215. In some examples, the closed loop index ($h_{b,f,c}(i, l)$) may be equal to the current uplink shared channel power control adjustment. Additionally, or alternatively, the closed loop index ($h_{b,f,c}(i, l)$) may be indicated to the UE 215 via dynamic signaling (e.g., the transmission control protocol in a downlink control information (DCI) or a MAC-CE).

In some examples, one or more power control parameters may be configured for the UE 215 in a control message (e.g., an RRC message). For example, some power control parameters (e.g., $P_{O_{SRS},b,f,c}(q_s)$, $\alpha_{SRS,b,f,c}(q_s)$, $h_{b,f,c}(i, l)$) may be configured for the UE 215 per SRS resource (e.g., of the SRS resource set 232) and other power control parameters (e.g., reference signals for measuring the pathloss ($PL_{b,f,c}(q_d)$)) may be configured for the UE 215 per SRS resource set 232. Additionally, or alternatively, the network entity 205 may configure a spatial filter (e.g., a transmission filter, a beamforming direction) for the UE 215 per SRS resource of the SRS resource set 232.

For example, the network entity 205 may configure (e.g., separately configure) the UE 215 with parameters (e.g., spatial parameters, beamforming parameters) for uplink communications and downlink communications. For example, the network entity 205 may configure the UE 215 with spatial parameters for uplink communications via spatial relationship information. For example, the spatial relationship information (e.g., configured by the network entity 205 via a SpatialRelationInfo IE) may indicate the SRS resource set 232 and a spatial filter (e.g., beamforming direction) for each SRS resource of the SRS resource set 232. For example, the UE 215 may use the spatial relationship information to determine (e.g., select) a beamforming direction (e.g., an uplink transmit beam, the beam 225-a) for the SRS resource 231. In such an example, the UE 215 may apply a default set of power control parameters (e.g., indicated to the UE 215 via an RRC message) for transmitting one or more SRSs over each SRS resource. In some examples, the default set of power control parameters may be associated with the SRS resource set 232 and be applied to (e.g., common for) each SRS resources of the SRS resource set 232. In such an example, the network may configure (e.g., separately configure) the UE 215 with spatial parameters for downlink communications via a TCI state (e.g., a downlink TCI state). That is, the network entity 205 may configure the UE 215 with one or more TCI states to be used by the UE 215 for selecting a downlink receive beam (e.g., a beamforming direction for downlink communications with the network entity 205).

In other examples, the network entity 205 may configure the UE 215 to operate according to a unified TCI state framework. For example, the network entity 205 may configure the UE 215 with an uplink TCI state that may be associated with (e.g., used by the UE 215 for selecting) an uplink transmit beam or a joint TCI state that may be associated with (e.g., used by the UE 215 for selecting) both an uplink transmit beam and a downlink receive beam. In such an example, the network may configure each SRS resource (e.g., of the SRS resource set 232) with an uplink TCI state (or joint TCI state) that may be associated with a respective set (subset) of power control parameters (e.g., $P_{O_{SRS},b,f,c}(q_s)$, $\alpha_{SRS,b,f,c}(q_s)$, and $h_{b,f,c}(i, l)$). Such power control parameters may be referred to as TCI state-dependent power control parameters. In other examples, the network may configure the UE 215 with power control parameters that are not associated with an uplink TCI state. For example, the network entity 205 may configure the UE 215 with a set of power control parameters that are associated with the SRS resource set 232. That is, the network may configure the UE 215 with a set of power control parameters that may be common to multiple SRS resources (e.g., included in the active bandwidth part and configured with the uplink TCI state) and independent of the uplink TCI state. Such power control parameters may be referred to as TCI state-independent power control parameters. Additionally, or alternatively, the network entity 205 may configure the UE 215 with multiple sets of power control parameters, for example to be applied based on traffic (e.g., current traffic) conditions.

In some examples of the unified TCI state framework, power control parameters (e.g., $P_{O_{SRS},b,f,c}(q_s)$, $\alpha_{SRS,b,f,c}(q_s)$, and $h_{b,f,c}(i, 1)$) configured for uplink shared channel transmissions (e.g., physical uplink shared channel (PUSCH) transmissions), uplink control channel transmissions (e.g., physical uplink control channel (PUCCH) transmissions), and SRS transmissions may be associated with an uplink TCI state (or a joint TCI state) and may be configured per bandwidth part for each of the PUSCH transmissions, each PUCCH transmissions, and each SRS transmissions. In some examples, one (e.g., an individual) set of power control parameters may be (e.g., optionally) associated with each uplink TCI state (or each joint TCI state) configured in a bandwidth part, for example via an RRC message. In some examples, one or more power control parameters (e.g., the closed loop index ($h_{b,f,c}(i, 1)$) may be associated with an uplink TCI state (or a joint TCI state) and may be dynamically updated by the network entity 205, for example via a MAC-CE. Additionally, or alternatively, two or more TCI states may be associated with a same beamforming direction and different power control parameters.

In some examples, by configuring the UE 215 with TCI state-dependent power control parameters (e.g., power control parameters that are dependent on an uplink TCI state or a joint TCI state) the network may improve (e.g., increase) the granularity of uplink power control in multiple (e.g., different) beamforming directions. For example, the UE 215 may determine to increase the transmit power for beamforming directions in which the pathloss is relatively large (e.g., compared to other beamforming directions) and decrease the transmit power for beamforming direction in which the pathloss is relatively small (e.g., compared to other beamforming directions). In some examples, the network may refrain from configuring the UE 215 with TCI state-dependent power control parameters. In such examples, the UE 215 may use the TCI state-independent power control parameters. For example, the UE 215 may determine to apply the default set of power control parameters that are associated with to the SRS resource set 232. In such an example, the set of power control parameters may be applied across (e.g., shared by) each SRS resource in the SRS resource set 232.

Additionally, or alternatively, the UE 215 may determine to apply the TCI state-independent power control parameters based on a use (e.g., an intended use) for the SRSs. For example, in some instances, it may be desirable for the network entity 205 to configure the UE 215 to use the TCI state-independent power control parameters, while in other instances, it may be desirable for the network entity 205 to configure the UE 215 to use the TCI state-dependent power control parameters power control parameters. For example, the UE 215 may perform a beam sweep over multiple SRS resources and each SRS resource, such as the SRS resource 231, may be associated with a different uplink spatial filter (e.g., a different beamforming direction). In some examples, the UE 215 may perform the beam sweep procedure as part of a beam management procedure for identifying a beam pair for communications with the network entity 205. In such an example, the network entity 205 may perform measurements (e.g., reference signals received power (RSRP) measurements) on the SRSs (e.g., the SRS 230 and one or more other SRSs 230 (not shown)) transmitted by the UE 215 over the multiple SRS resources (e.g., the SRS resource 231 and one or more other SRS resources 231 (not shown)).

In some examples, the SRS resources (e.g., from a same SRS resource set 232) may correspond to (e.g., follow) a same power control configuration. That is, the UE 215 may apply the TCI state-independent power control parameters across each SRS resource included in the SRS resource set 232. In such examples (e.g., if the configured SRS resources belong to a same set), an order of the uplink measurements (e.g., the RSRP measurements performed by the network entity 205) may indicate (e.g., to the network entity 205) an order of the pathloss in the different beamforming directions. That is, if the UE 215 applies a same set of power control parameters (e.g., uses a same transmit power), for transmitting multiple SRSs (e.g., the SRS 230 and one or more other SRSs 230 (not shown)) over the multiple SRS resources (e.g., the SRS resource 231 and one or more other SRS resources 231 (not shown)), the network entity 205 may determine that the received power measured by the network entity 205 for the SRS 230 corresponds to the pathloss in the direction the SRS 230 was transmitted (e.g., in the beamforming direction of the beam 225-a). As a result, the reliability of the beam management procedure may be improved.

In other examples, the UE 215 may apply a different set of power control parameters for each SRS resource included in the SRS resource set 232. For example, TCI states associated with different SRS resources of the SRS resource set may be configured with different power control parameters (e.g., the TCI state-dependent power control parameters). In such an example, the UE 215 may apply the TCI state-dependent power control parameters for transmitting the multiple SRSs (e.g., the SRS 230 and one or more other SRSs 230 (not shown)) over one or more SRS resources (e.g., for performing the beam sweep procedure). In some examples, by applying the TCI state-dependent power control parameters for transmitting the multiple SRSs (e.g., the SRS 230 and one or more other SRSs 230 (not shown)), the UE 215 may use a transmit power that corrects for a different fraction of pathloss (e.g., apply a different $\alpha_{SRS,b,f,c}(q_s)$) in different beamforming directions. As a result, the order of the uplink measurements (e.g., the RSRP measurements performed at the network entity 205) may not indicate (e.g., reflect) the order of the pathloss in the different beamforming directions and the reliability of the beam management procedure may be degraded.

Additionally, or alternatively, uplink power control techniques in which the UE 215 may be configured to apply a same set of power control parameters across multiple SRS resources (e.g., with a same TCI state or different TCI states which share a quasi co-location relationship) may be prohibitive and result in degraded performance. For example, the network entity 205 may configure the UE 215 with multiple SRS resources (e.g., the SRS resource 231 and one or more other SRS resources 231 (not shown)) that are associated with TCI states (e.g., in a component carrier bandwidth part) corresponding to a same quasi co-location relationship. For instance, the network entity 205 may configure the UE 215 with a first SRS resource (not shown) and a second SRS resource (not shown) that are associated with a same TCI state (or two different TCI states that correspond to a same quasi co-location relationship). In some examples, to determine uplink precoding for the UE 215, the network entity 205 may configure the first SRS resource to be used by the UE 215 for codebook or non-codebook transmissions. As such, it may be desirable for the UE 215 to apply power control parameters that are dependent on the TCI state of the first SRS resource (e.g., the TCI state-dependent power control parameters).

Additionally, or alternatively, the network entity 205 may configure the second SRS resource to be used by the UE 215 for an uplink beam sweep as part of a beam management procedure. In such an example, it may be desirable for the UE 215 to apply power control parameters which are common to other SRS resources (e.g., other TCI states of the other SRS resources) in the SRS resource set 232. That is, it may be desirable for the UE 215 to apply power control parameters that are independent of the TCI state of the second SRS resource (e.g., the TCI state-independent power control parameters). Therefore, power control techniques that enable flexible configuration of power control parameters may provide one or more enhancements for uplink power control in a wireless communications system.

For example, the network may provide the UE 215 with multiple configurations for uplink power control. In some examples, the network may configure the UE with one or more SRS resources (e.g., the SRS resource 231 and one or more other SRS resources 231 (not shown)) that are associated with TCI states that may not be configured with TCI state-dependent power control parameters. For example, the SRS resources 231 may be configured with spatial relationship information (e.g., via the SpatialRelationInfo IE) that may not be associated with power control parameters. In such an example, the network entity 205 may configure the UE 215 to apply the default power control parameters that are common to the SRS resource set 232. That is, the network may configure the UE 215 to apply the TCI state-independent power control parameters. Additionally, or alternatively, the UE 215 may be configured with multiple SRS resources (e.g., the SRS resource 231 and one or more other SRS resources 231 (not shown)) that are each associated with a TCI state. In some examples, the TCI states may be associated with a same quasi co-location relationship and different power control parameters. That is, each TCI state associated with the multiple SRS resources (e.g., the SRS resource 231 and one or more other SRS resources 231 (not shown)) may correspond to a respective (e.g., different) set of power control parameters (e.g., $P_{O_{SRS},b,f,c}(q_s)$, $\alpha_{SRS,b,f,c}(q_s)$, and $h_{b,f,c}(i, l)$). In such an example, the number of TCI states configured at the UE 215 may be increased for a number of beamforming directions (e.g., an angular granularity)

As illustrated in the example of FIG. 2, the wireless communications system 200 may support power control techniques that enable flexible configuration of power control parameters. For example, the UE 215 may receive (e.g., from the network entity 205) a first message indicating a first configuration 220 for a set of resources (e.g., the SRS resource set 232) for transmitting reference signals (e.g., the SRS 230). In some examples, the first configuration 220 may include a first indication of a first set of power control parameters corresponding to the SRS resource set 232. That is, the first configuration may include an indication of a set of TCI state-independent power control parameters. Additionally, or alternatively, the first configuration 220 may include a second indication of a set of TCI states (e.g., the TCI state 226-a, the TCI state 226-b, one or more other TCI states 226 (not shown)). In some examples, each TCI state of the set of TCI states may be associated with a respective SRS resource of the SRS resource set 232. For example, the TCI state 226-a may be associated with the SRS resource 231.

Additionally, or alternatively, the UE 215 may receive (e.g., from the network entity 205) a second message indicating a second configuration 221 for the set of TCI states. In some examples, the second configuration 221 may include a third indication of a second set of power control parameters corresponding to the set of TCI states. That is, the second configuration may include an indication of a set of TCI state-dependent power control parameters. In some examples, the UE 215 may transmit the SRSs 230 in accordance with a determined set of power control parameters that may include the first set of power control parameters (e.g., indicated by the first configuration 220) or the second set of power control parameters (e.g., indicated by the second configuration 221). For example, the UE 215 may transmit the SRS 230 over the SRS resource 231 to the network entity 205 according to the determined set of power control parameters.

In some examples, if the TCI state of the SRS 230 (e.g., the TCI state associated with the SRS resource 231) is configured with a set of power control parameters (e.g., has a power control configuration), the UE 215 may not receive (or may refrain from applying) a set of power control parameters configured for the SRS resource 231. That is, to transmit the SRS 230, the UE 215 may refrain from applying a subset of power control parameters that is included in the first set of power control parameters and is configured for the SRS resource 231 and may (e.g., instead) apply a subset of power control parameters that is included in the second set of power control parameters and is configured for the TCI state associated with the beam 225-a. For example, the UE 215 may determine that each TCI state of the set of TCI states corresponds to a respective subset of power control parameters included in the second set of power control parameters. As such, the UE 215 may determine to apply the second set of power control parameters. In some examples, the UE 215 may apply the second set of power control parameters (or subsets of power control parameters that are included in the second set of power control parameters and are each configured for a TCI state) based on the network (e.g., the network entity 205) refraining from configuring the UE 215 with the first set of power control parameters (e.g., based on the first indication being absent from the first message).

Additionally, or alternatively, if the SRS resource 231 (e.g., and the other SRS resources 231 (not shown) or the SRS resource set 232) is configured with a set of power control parameters (e.g., has a power control configuration), the UE 215 may refrain from using (or may override) the subset of power control parameters configured for the TCI state 226-a associated with the beam 225-a. That is, to transmit the SRS 230, the UE 215 may apply the first set of power control parameters (or a subset of power control parameters that is included in the first set of power control parameters and is configured for the SRS resource 231) and may refrain from applying the subset of power control parameters that is included in the second set of power control parameters and is configured for the TCI state 226-a associated with the beam 225-a. In some examples, the UE 215 may apply the first set of power control parameters (or subsets of power control parameters that is included in the first set of power control parameters and are each configured for a SRS resource) based on the network (e.g., the network entity 205) refraining from configuring the UE 215 with the second set of power control parameters (e.g., based on the second indication being.

Additionally, or alternatively, the UE 215 may determine to apply the first set of power control parameters or the second set of power control parameters based on a use (e.g., an intended use) of the one or more SRSs (e.g., the SRS 230). For example, the UE 215 may receive a third message (not shown) indicating a use (e.g., configuring a use) for the SRS resource 231 (e.g., and other SRS resources 231, not shown). In some examples, the third message may indicate that the SRS resource 231 (e.g., and the other SRS resources 231, not shown) are configured for a beam management procedure. In such examples, the UE 215 may determine to apply (or may be configured to apply) the first set of power control parameters. In other examples, the third message may indicate that the SRS resource 231 (and the other SRS resources 231, not shown) are configured for codebook or non-codebook transmissions. In such examples, the UE 215 may determine to apply (or may be configured to apply) the second set of power control parameters.

Additionally, or alternatively, the UE 215 may determine to apply the first set of power control parameters or the second set of power control parameters based on an indication from the network (e.g., via dynamic signaling). For example, the third message (not shown) may include an indication of a third configuration (not shown) for the UE 215 to transmit the one or more SRSs (e.g., the SRS 230 and one or more other SRSs 230 (not shown)) according to the first set of power control parameters or the second set of power control parameters. In some examples, the third message may include an indication (e.g., a bit in an IE, such as an RRC IE) of the third configuration per SRS resource, such as the SRS resource 231, or per SRS resource set 232. In response to receiving the third message, the UE 215 may, in some examples, transmit the SRS 230 according the set of power control parameters indicated by the third configuration. In some examples, the network entity 205 may update the third configuration (e.g., may update the bit in the third message indicating the third configuration), for example via dynamic signaling (e.g., via a DCI message or a MAC-CE). That is, the UE 215 may receive a fourth message (not shown) indicating an update to the third configuration. In such examples, the UE 215 may transmit the SRS 230 according to the indicated update.

Additionally, or alternatively, the UE 215 may determine to apply the first set of power control parameters or the second set of power control parameters based on an indication (e.g., from the network) that the set of TCI states (e.g., associated with the SRS resource set 232) are different from TCI states associated with a set of dedicated resources for transmitting uplink shared channel transmissions (e.g., dedicated physical uplink shared channel (PUSCH) transmissions). For example, the third message (e.g., an RRC message) may include an indication (e.g., an RRC flag bit) configuring the SRS resource 231 (or the set of SRS resource 231) with (e.g., to follow) TCI states that are different from (or the same as) TCI states associated with the dedicated PUSCH transmissions. In such an example, if the SRS resource 231 (or the SRS resource set 232) is configured (e.g., by the RRC flag bit) to be different from the TCI states associated with the dedicated PUSCH transmissions, the UE 215 may determine to apply a common set of power control parameters. For example, the UE 215 may determine to apply the UE 215 may apply a subset of power control parameters that are included in the second set of power control parameters to each SRS resource included in a same SRS resource set 232. In some examples, the subset of power control parameters may correspond to the TCI state of an SRS resource (e.g., included in the SRS resource set 232) with an SRS resource identifier (e.g., a relatively lowest or a relatively highest SRS resource identifier compared to other SRS resources of the SRS resource set 232). That is, the UE 215 may determine to apply the power control parameters associated with the TCI state of a configured (e.g., specified, predefined, preconfigured) SRS resource, such as the SRS resource with a relatively low identifier compared to other SRS resources of the SRS resource set 232, to each SRS resource included in the SRS resources set 232 (e.g., rather than applying a respective subset of power control parameters configured for each SRS resource of the SRS resource set 232).

Additionally, or alternatively, if the SRS resource 231 (or the SRS resource set 232) is configured (e.g., by the RRC flag bit) with a same set of TCI states as the TCI states associated with the dedicated PUSCH transmissions, the UE 215 may determine to apply a power control configuration associated with the dedicated PUSCH transmissions or a power control configuration associated with the TCI state of the dedicated PUSCH transmissions. In some examples, the power control configuration associated with the dedicated PUSCH transmissions and the power control configuration associated with the TCI state of the dedicated PUSCH transmissions may each include a set of power control parameters (e.g., $P_{O_{SRS},b,f,c}(q_s)$, $\alpha_{SRS,b,f,c}(q_s)$, $h_{b,f,c}(i, 1)$, and reference signals for measuring pathloss ($PL_{b,f,c}(q_d)$))

In some examples, the UE 215 may determine to use a default set of power control parameters. For example, the network (e.g., the network entity 205) may refrain from configuring the UE 215 with the first set of power control parameters (e.g., the first indication may be absent from the first message) or the second set of power control parameters (e.g., the second indication may be absent from the second message). In such examples, the UE 215 may determine to use the default power control configuration including the default set of power control parameters. The default set of power control parameters may be the first set of power control parameters or the second set of power control parameters (or another set of power control parameters different from the first set and the second set of power control parameters). The default power control configuration may be configured (e.g., specified, preconfigured) for the UE 215 or the default power configuration may be indicated to the UE 215 by the network. For example, the UE 215 may receive an indication of the default configuration from the network entity 205.

In some examples, the first set of power control parameters may include multiple subset of power control parameters that each corresponds to a respective SRS resource of the SRS resource set 232. For example, the first configuration (e.g., or another configuration indicated to the UE 215 by the network entity 205) may include an indication of a subset of power control parameters for each SRS resource included in the SRS resource set 232. In some examples, however, if such an indication is absent from the first configuration (or another configuration indicated to the UE 215 by the network entity 205) the UE 215 may determine to use a common set of power control parameters for each SRS resource included in the SRS resource set 232. For example, the UE 215 may determine that the first set of power control parameters is the common set of power control parameters corresponding to each resource of the set of resources.

In some examples, the SRS resource set 232 may be based on one or more capabilities of the UE 215. For example, the UE 215 may transmit a report (not shown) indicating one or more capabilities of the UE 215 (e.g., one or more UE capabilities) for controlling (e.g., associated with controlling) a transmit power at the UE 215. In such an example, the network entity 205 may configure the SRS resources set 232 based on the indicated UE capabilities. In some examples, the one or more UE capabilities may include a capability of the UE 215 to be configured with the first set of power control parameters (e.g., corresponding to the SRS resource set 232), a capability of the UE 215 to be configured with the second set of power control parameters (e.g., corresponding to the set of TCI states), a capability of the UE 215 to be dynamically configured with a set of power control parameters, a capability of the UE 215 to determine a set of power control parameters according to a usage (e.g., an indented use) for the SRS resource 231 (e.g., and other SRS resources 231, not shown), or any combination thereof.

Figure 3:
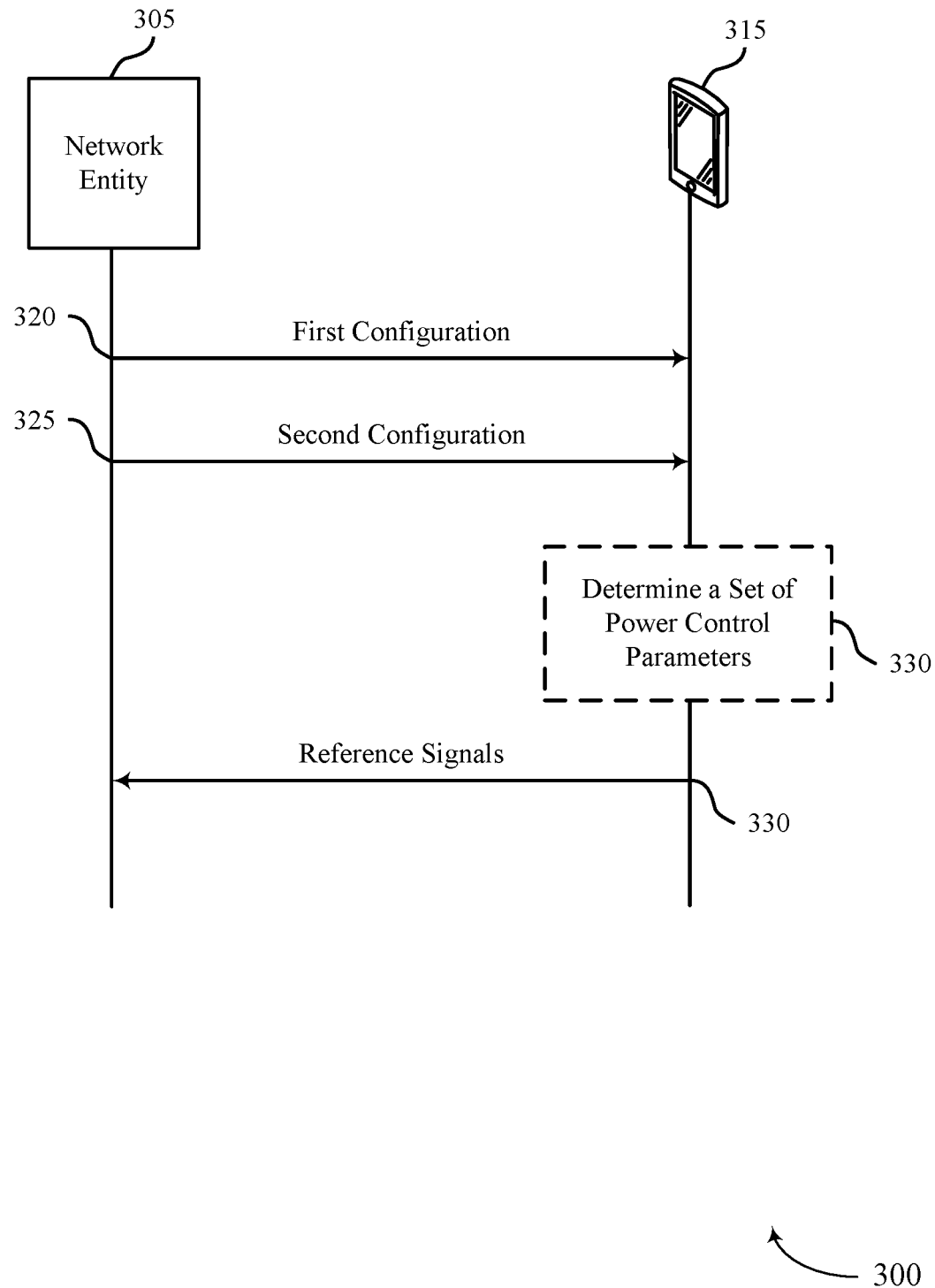
FIG. 3 illustrates an example of a process flow that supports techniques for flexible configuration of power control parameters in accordance with various aspects of the present disclosure.

FIG. 3 illustrates an example of a process flow 300 that supports techniques for flexible configuration of power control parameters in accordance with various aspects of the present disclosure. For example, the process flow 300 may include example operations associated with a UE 315 and a network entity 305, which may be examples of the corresponding devices as described with reference to FIGS. 1 and 2. The operations performed by the UE 315 and the network entity 305 may support improvements to communications between one or both of the UE 315 and the network, among other benefits. In the following description of the process flow 300, operations between the UE 315 and the network entity 305 may occur in a different order or at different times than as shown. Some operations may also be omitted from the process flow 300, and other operations may be added to the process flow 300.

At 320, a communication device (e.g., the UE 315) may receive a first message indicating a first configuration for a set of resources for transmitting reference signals. The first configuration may be an example of a first configuration as described with reference to FIG. 2. For example, the first configuration may include a first indication of a first set of power control parameters corresponding to the set of resources and a second indication of a set of TCI states. The first set of power control parameters may be an example of a first set of power control parameters as described with reference to FIG. 2. For example, the first set of power control parameters may be a set of TCI state-independent power control parameters. In some examples, each TCI state of the set TCI states may be associated with a respective resource of the set of resources.

At 325, the UE 315 may receive a second message indicating a second configuration for the set of TCI states. The second configuration may be an example of a second configuration as described with reference to FIG. 2. For example, the second configuration may include a third indication of a second set of power control parameters corresponding to the set of TCI. In some examples, the second set of power control parameters may be an example of a second set of power control parameters as described with reference to FIG. 2. For example, the second set of power control parameters may be a set of TCI state-dependent power control parameters.

In some examples, at 330, the UE 315 may determine a set of power control parameters. At 330, the UE 315 may transmit the reference signals in accordance with the set of power control parameters determined at 330. In some examples, the determined set of power control parameters may include the first set of power control parameters. In some other examples, the determined set of power control parameters may include the second set of power control parameters. In some examples, by configuring the UE 315 with the first set of power control parameters and the second set of power control parameters, the UE 115 improve the reliability of communications between the UE 115 may the network.

Figure 4:
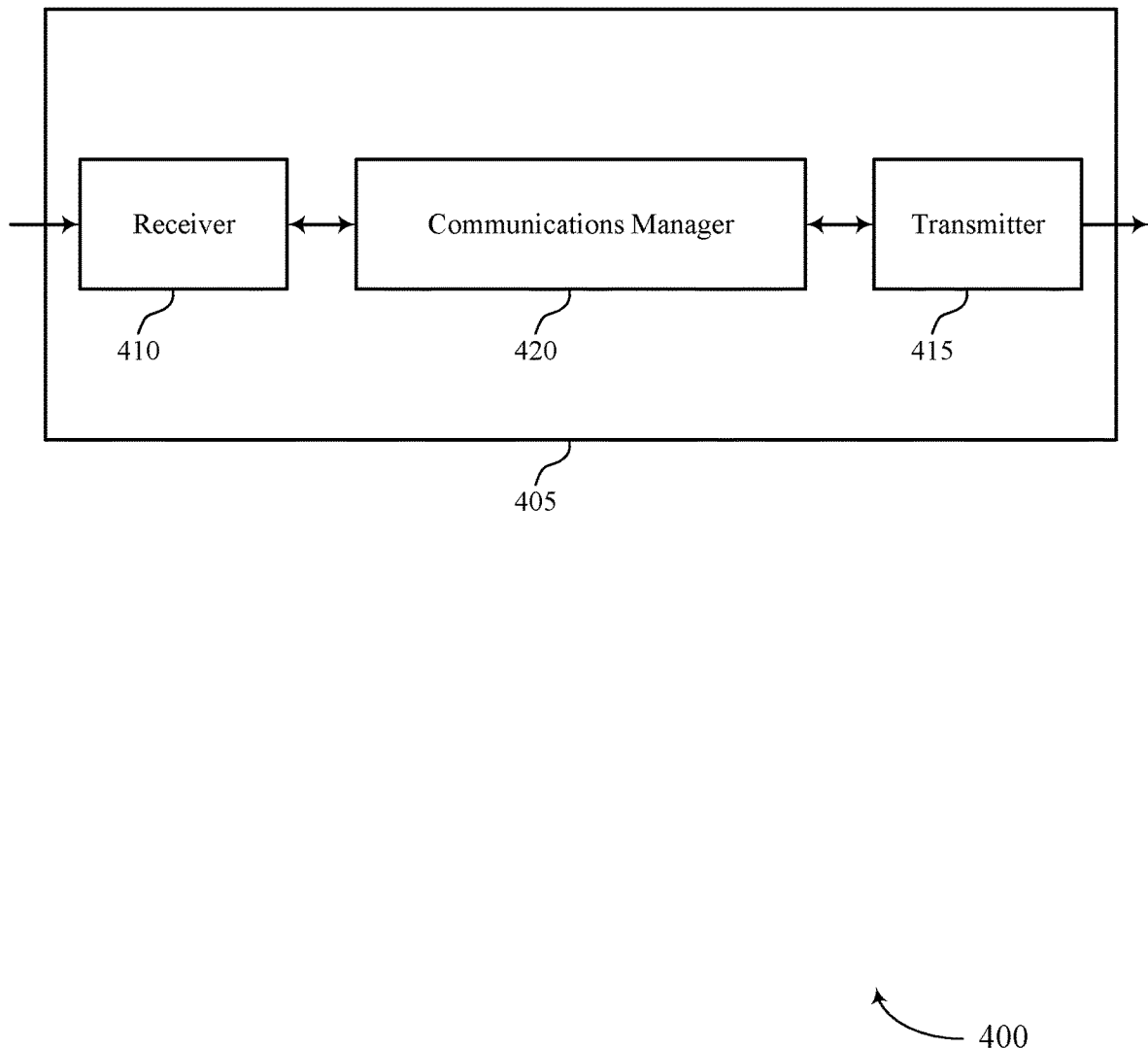
FIGS. 4 and 5 show block diagrams of devices that support techniques for flexible configuration of power control parameters in accordance with various aspects of the present disclosure

FIG. 4 shows a block diagram 400 of a device 405 that supports techniques for flexible configuration of power control parameters in accordance with various aspects of the present disclosure. The device 405 may be an example of aspects of a UE 115 as shown in FIG. 1. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for flexible configuration of power control parameters). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for flexible configuration of power control parameters). In some examples, the transmitter 415 may be co-located with a receiver 410 in a transceiver. The transmitter 415 may utilize a single antenna or a set of multiple antennas.

The communications manager 420, the receiver 410, the transmitter 415, or various combinations thereof or various components thereof may be examples of means for performing various aspects of techniques for flexible configuration of power control parameters as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE (e.g., the device 405) in accordance with examples as disclosed herein. For example, the communications manager 420 may be configured as or otherwise support a means for receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The communications manager 420 may be configured as or otherwise support a means for receiving a second message indicating a second configuration for the set of TCI states, the second configuration including a third indication of a second set of power control parameters corresponding to the set of TCI states. The communications manager 420 may be configured as or otherwise support a means for transmitting the reference signals in accordance with a determined set of power control parameters, the determined set of power control parameters including the first set of power control parameters or the second set of power control parameters.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing and more efficient utilization of communication resources.

Figure 5:
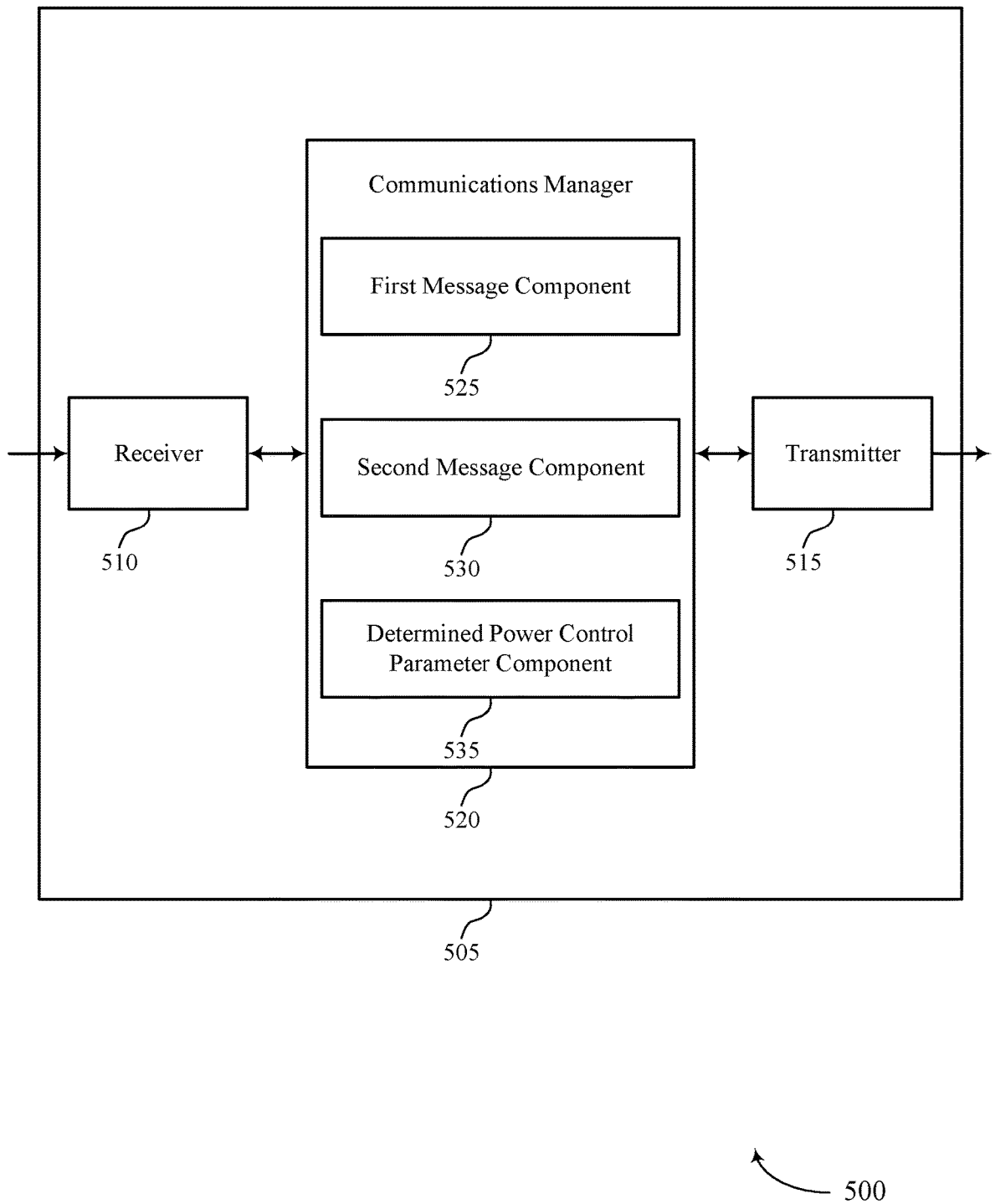

FIG. 5 shows a block diagram 500 of a device 505 that supports techniques for flexible configuration of power control parameters in accordance with various aspects of the present disclosure. The device 505 may be an example of aspects of a device 405 or a UE 115 as shown in FIG. 1. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for flexible configuration of power control parameters). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for flexible configuration of power control parameters). In some examples, the transmitter 515 may be co-located with a receiver 510 in a transceiver. The transmitter 515 may utilize a single antenna or a set of multiple antennas.

The device 505, or various components thereof, may be an example of means for performing various aspects of techniques for flexible configuration of power control parameters as described herein. For example, the communications manager 520 may include a first message component 525, a second message component 530, a determined power control parameter component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE (e.g., the device 505) in accordance with examples as disclosed herein. The first message component 525 may be configured as or otherwise support a means for receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The second message component 530 may be configured as or otherwise support a means for receiving a second message indicating a second configuration for the set of TCI states, the second configuration including a third indication of a second set of power control parameters corresponding to the set of TCI states. The determined power control parameter component 535 may be configured as or otherwise support a means for transmitting the reference signals in accordance with a determined set of power control parameters, the determined set of power control parameters including the first set of power control parameters or the second set of power control parameters.

Figure 6:
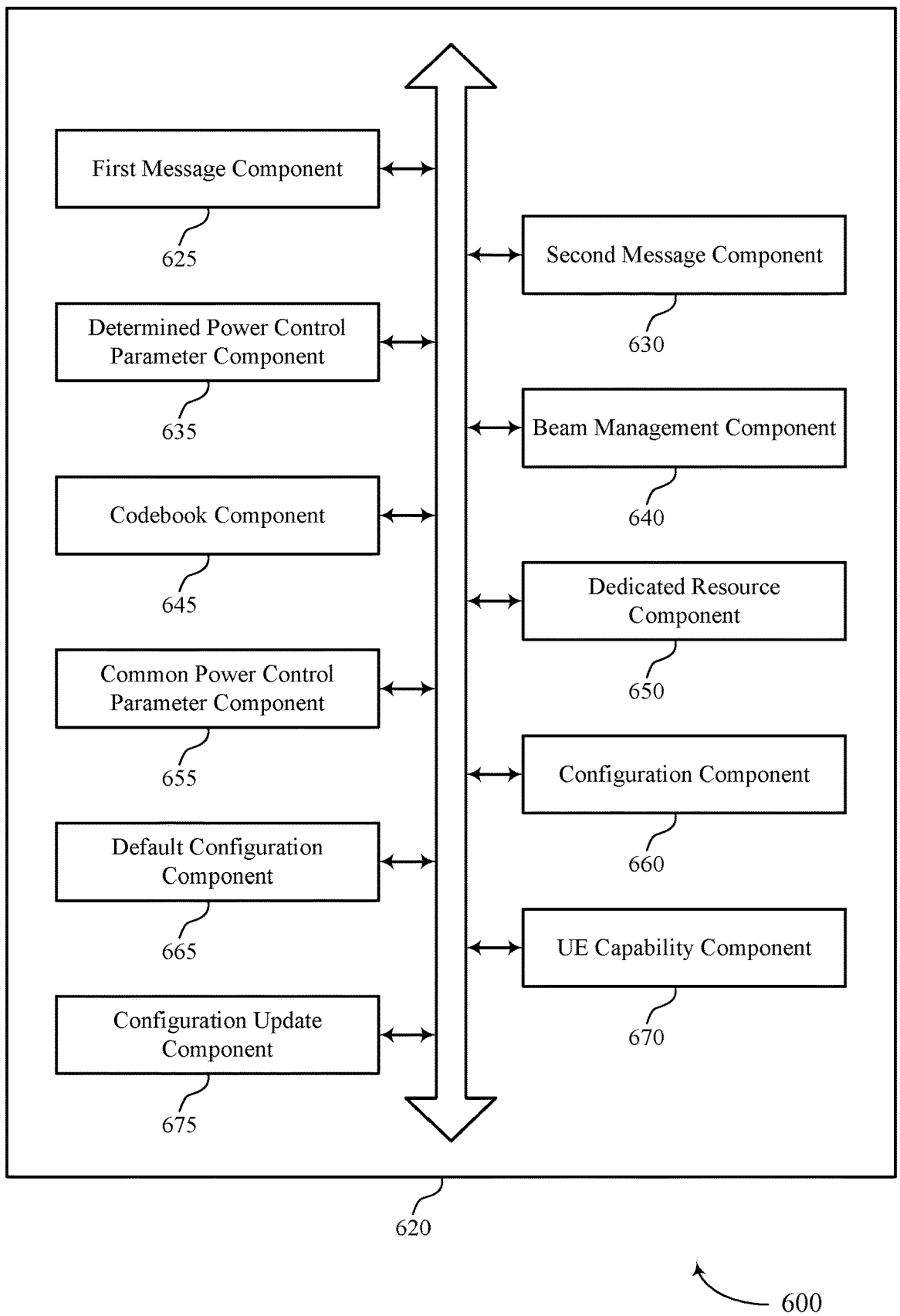
FIG. 6 shows a block diagram of a communications manager that supports techniques for flexible configuration of power control parameters in accordance with various aspects of the present disclosure.

FIG. 6 shows a block diagram 600 of a communications manager 620 that supports techniques for flexible configuration of power control parameters in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for flexible configuration of power control parameters as described herein. For example, the communications manager 620 may include a first message component 625, a second message component 630, a determined power control parameter component 635, a beam management component 640, a codebook component 645, a dedicated resource component 650, a common power control parameter component 655, a configuration component 660, a default configuration component 665, a UE capability component 670, a configuration update component 675, or any combination thereof. Each of these components may communicate, directly or indirectly, with one another (e.g., via one or more buses).

The communications manager 620 may support wireless communication at a UE (e.g., a UE 115 as shown in FIG. 1) accordance with examples as disclosed herein. The first message component 625 may be configured as or otherwise support a means for receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The second message component 630 may be configured as or otherwise support a means for receiving a second message indicating a second configuration for the set of TCI states, the second configuration including a third indication of a second set of power control parameters corresponding to the set of TCI states. The determined power control parameter component 635 may be configured as or otherwise support a means for transmitting the reference signals in accordance with a determined set of power control parameters, the determined set of power control parameters including the first set of power control parameters or the second set of power control parameters.

In some examples, the second message component 630 may be configured as or otherwise support a means for determining, based on the received second message, that each TCI state of the set of TCI states corresponds to a respective subset of power control parameters included in the second set of power control parameters, where the determined set of power control parameters is the second set of power control parameters based on the determination.

In some examples, the first message component 625 may be configured as or otherwise support a means for determining, based on the received first message, that the set of resources for transmitting the reference signals corresponds to a set of power control parameters, where the determined set of power control parameters is the first set of power control parameters based on the determination.

In some examples, the beam management component 640 may be configured as or otherwise support a means for receiving a third message indicating that the set of resources for transmitting the reference signals are configured for a beam management procedure, where the determined set of power control parameters is the first set of power control parameters based on the received third message.

In some examples, the codebook component 645 may be configured as or otherwise support a means for receiving a third message indicating that the set of resources for transmitting the reference signals are configured for codebook or non-codebook transmissions, where the determined set of power control parameters is the second set of power control parameters based on the received third message.

In some examples, the dedicated resource component 650 may be configured as or otherwise support a means for receiving a third message indicating that the set of TCI states are different from TCI states associated with a set of dedicated resources for transmitting uplink shared channel transmissions. In some examples, the common power control parameter component 655 may be configured as or otherwise support a means for determining, based on the received third message, that the second set of power control parameters is a common set of power control parameters corresponding to each resource of the set of resources, where the common set of power control parameters is based on a TCI state associated with a resources of the set of resources for transmitting the reference signals, and where the determined set of power control parameters is the second set of power control parameters based on the determination. In some examples, the common set of power control parameters is further based on an identifier of the resources of the set of resources.

In some examples, the configuration component 660 may be configured as or otherwise support a means for receiving a third message indicating a third configuration for the UE to transmit the reference signals according to the first set of power control parameters or the second set of power control parameters, where transmitting the reference signals in accordance with the determined set of power control parameters is based on the third configuration.

In some examples, the configuration update component 675 may be configured as or otherwise support a means for receiving a fourth message indicating an update to the third configuration, where transmitting the reference signals in accordance with the determined set of power control parameters is further based on the update to the third configuration. In some examples, the third message is an RRC message and the fourth message is a DCI message or a MAC-CE.

In some examples, the default configuration component 665 may be configured as or otherwise support a means for identifying a default configuration for transmitting the reference signals, where the default configuration indicates for the UE to transmit the reference signals in accordance with the first set of power control parameters or the second set of power control parameters, and where transmitting the reference signals in accordance with the determined set of power control parameters is based on the identified default configuration.

In some examples, the default configuration component 665 may be configured as or otherwise support a means for receiving a third message indicating the default configuration for transmitting the reference signals, where identifying the default configuration is based on the received third message. In some examples, the default configuration is configured at the UE. In some examples, the first configuration further includes a fourth indication of a set of multiple subsets of power control parameters. In some examples, each subset of the set of multiple subsets corresponds to a resource of the set of resources.

In some examples, the common power control parameter component 655 may be configured as or otherwise support a means for determining that the first set of power control parameters is a common set of power control parameters corresponding to each resource of the set of resources, based on an indication of a subset of power control parameters corresponding to each resource of the set of resources being absent from the first configuration.

In some examples, the UE capability component 670 may be configured as or otherwise support a means for transmitting a report indicating at least one UE capability associated with controlling a transmit power at the UE, where receiving the first message, the second message, or both, is based on the at least one UE capability.

In some examples, the at least one UE capability includes a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

Figure 7:
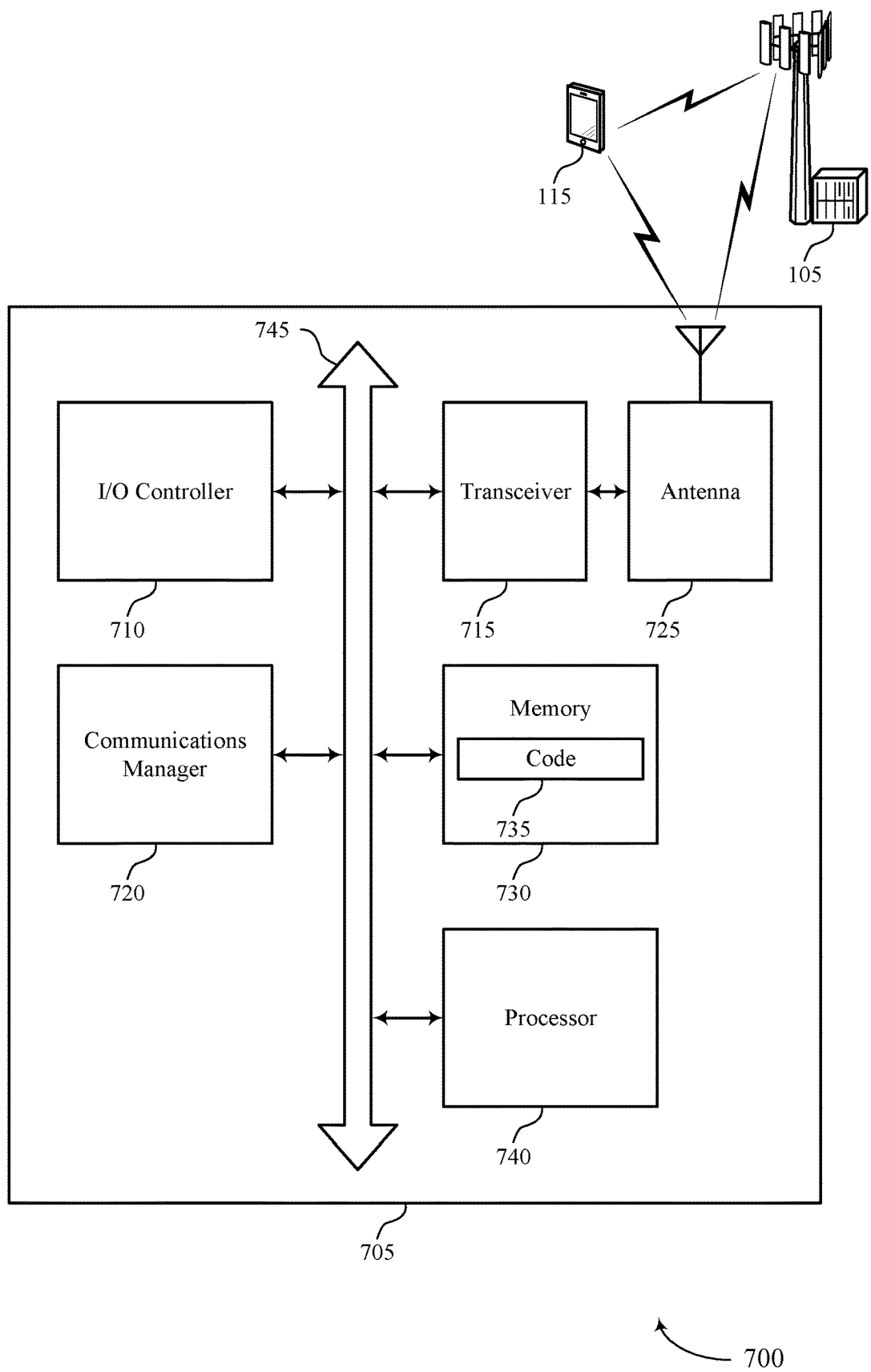
FIG. 7 shows a diagram of a system including a device that supports techniques for flexible configuration of power control parameters in accordance with various aspects of the present disclosure

FIG. 7 shows a diagram of a system 700 including a device 705 that supports techniques for flexible configuration of power control parameters in accordance with various aspects of the present disclosure. The device 705 may be an example of or include the components of a device 405, a device 505, or a UE 115 as shown in FIG. 1. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include an antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for flexible configuration of power control parameters). For example, the device 705 or a component of the device 705 may include a processor 740 and memory 730 coupled with or to the processor 740, the processor 740 and memory 730 configured to perform various functions described herein.

The communications manager 720 may support wireless communication at a UE (e.g., the device 705) in accordance with examples as disclosed herein. For example, the communications manager 720 may be configured as or otherwise support a means for receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The communications manager 720 may be configured as or otherwise support a means for receiving a second message indicating a second configuration for the set of TCI states, the second configuration including a third indication of a second set of power control parameters corresponding to the set of TCI states. The communications manager 720 may be configured as or otherwise support a means for transmitting the reference signals in accordance with a determined set of power control parameters, the determined set of power control parameters including the first set of power control parameters or the second set of power control parameters.

By including or configuring the communications manager 720 in accordance with examples as described herein, the device 705 may support techniques for improved communication reliability, improved user experience related to reduced processing, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for flexible configuration of power control parameters as described herein, or the processor 740 and the memory 730 may be otherwise configured to perform or support such operations.

Figure 8:
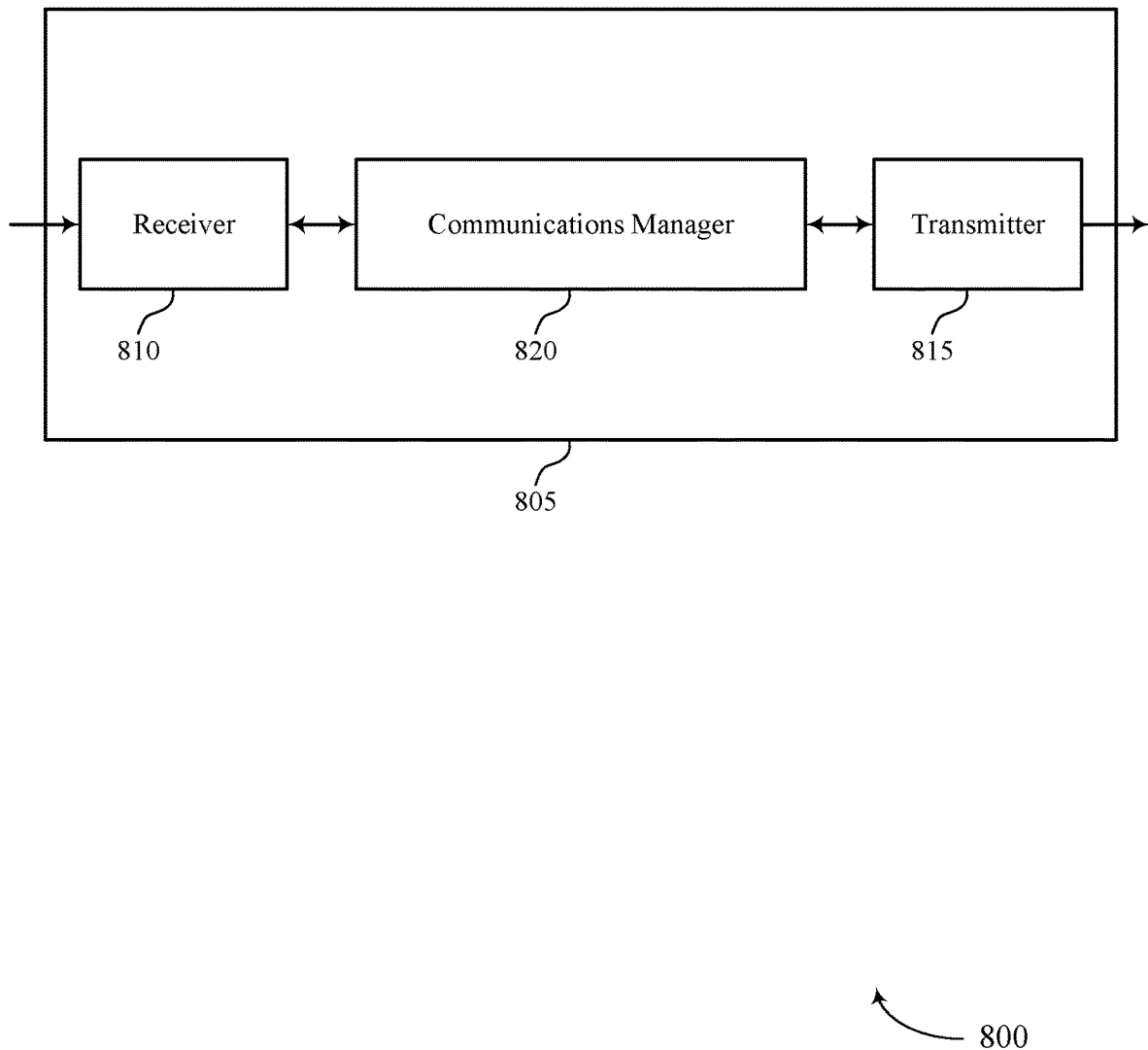
FIGS. 8 and 9 show block diagrams of devices that support techniques for flexible configuration of power control parameters in accordance with various aspects of the present disclosure.

FIG. 8 shows a block diagram 800 of a device 805 that supports techniques for flexible configuration of power control parameters in accordance with various aspects of the present disclosure. The device 805 may be an example of aspects of a network entity 105 as shown in FIG. 1. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for flexible configuration of power control parameters as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity (e.g., the device 805) in accordance with examples as disclosed herein. For example, the communications manager 820 may be configured as or otherwise support a means for outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The communications manager 820 may be configured as or otherwise support a means for outputting a second message indicating a second configuration for the set of TCI states, the second configuration including a third indication of a second set of power control parameters corresponding to the set of TCI states. The communications manager 820 may be configured as or otherwise support a means for obtaining the reference signals in accordance with a determined set of power control parameters, the determined set of power control parameters including the first set of power control parameters or the second set of power control parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing and more efficient utilization of communication resources.

Figure 9:
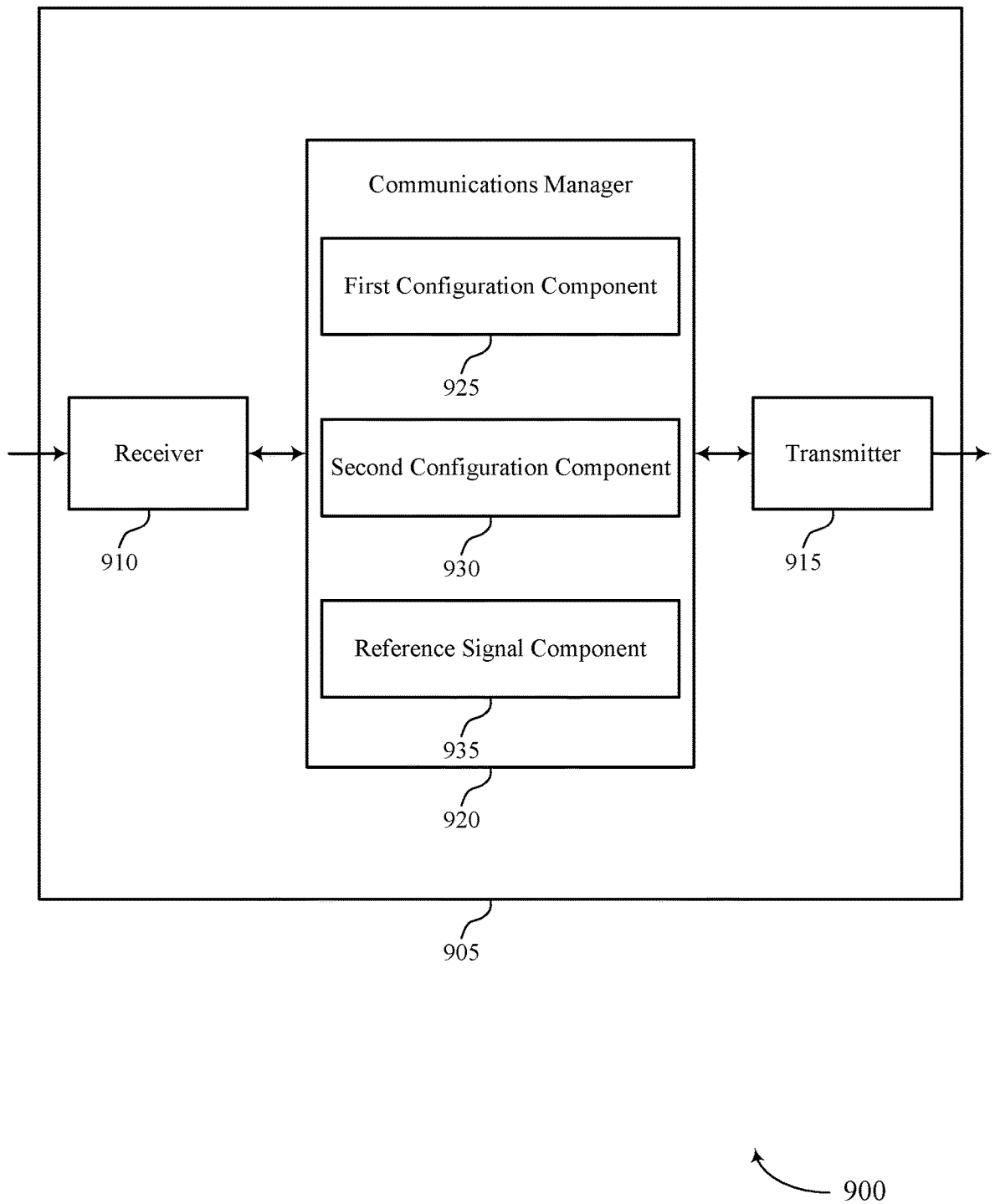

FIG. 9 shows a block diagram 900 of a device 905 that supports techniques for flexible configuration of power control parameters in accordance with various aspects of the present disclosure. The device 905 may be an example of aspects of a device 805 or a network entity 105 as shown in FIG. 1. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for flexible configuration of power control parameters as described herein. For example, the communications manager 920 may include a first configuration component 925, a second configuration component 930, a reference signal component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The first configuration component 925 may be configured as or otherwise support a means for outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The second configuration component 930 may be configured as or otherwise support a means for outputting a second message indicating a second configuration for the set of TCI states, the second configuration including a third indication of a second set of power control parameters corresponding to the set of TCI states. The reference signal component 935 may be configured as or otherwise support a means for obtaining the reference signals in accordance with a determined set of power control parameters, the determined set of power control parameters including the first set of power control parameters or the second set of power control parameters.

Figure 10:
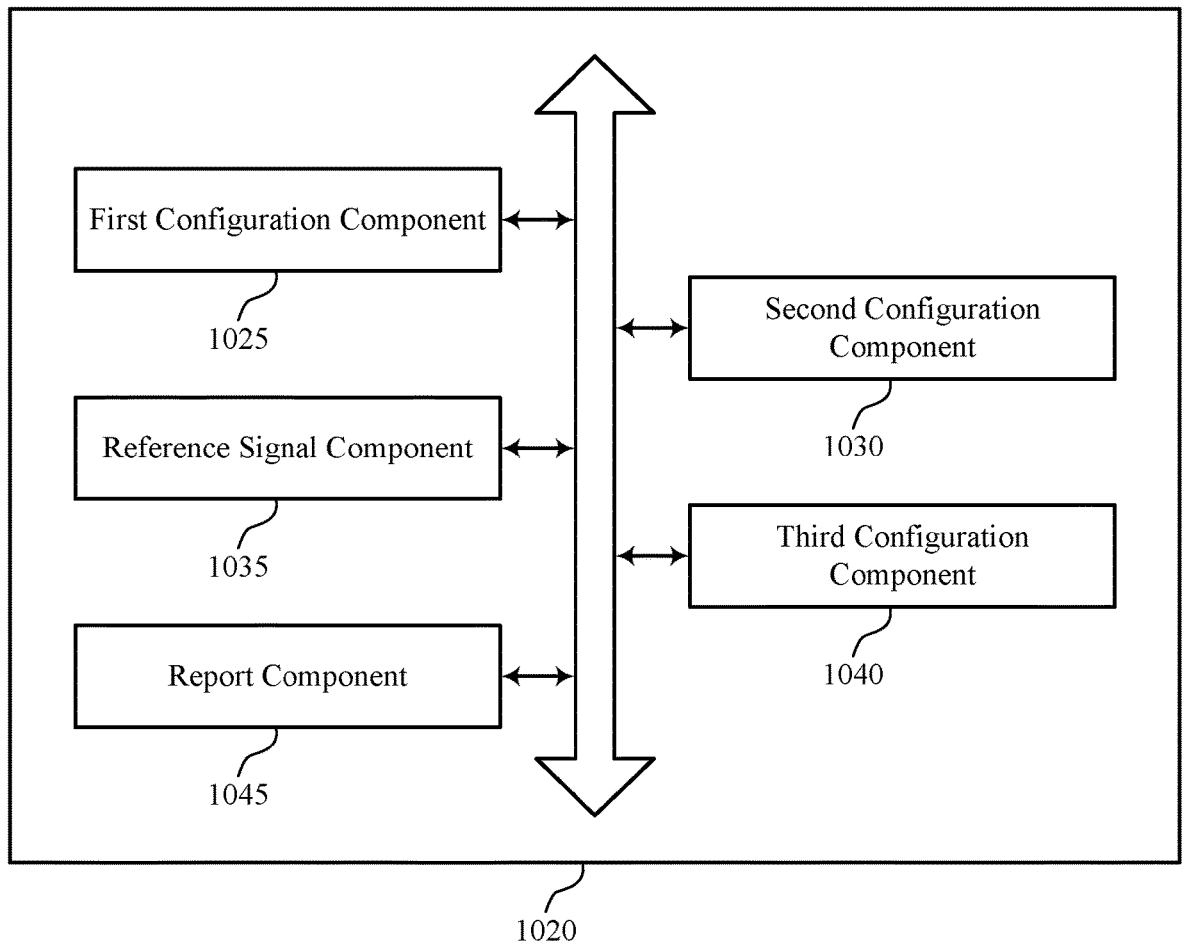
FIG. 10 shows a block diagram of a communications manager that supports techniques for flexible configuration of power control parameters in accordance with various aspects of the present disclosure.

FIG. 10 shows a block diagram 1000 of a communications manager 1020 that supports techniques for flexible configuration of power control parameters in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for flexible configuration of power control parameters as described herein. For example, the communications manager 1020 may include a first configuration component 1025, a second configuration component 1030, a reference signal component 1035, a third configuration component 1040, a report component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity (e.g., a network entity 105 as shown in FIG. 1) in accordance with examples as disclosed herein. The first configuration component 1025 may be configured as or otherwise support a means for outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The second configuration component 1030 may be configured as or otherwise support a means for outputting a second message indicating a second configuration for the set of TCI states, the second configuration including a third indication of a second set of power control parameters corresponding to the set of TCI states. The reference signal component 1035 may be configured as or otherwise support a means for obtaining the reference signals in accordance with a determined set of power control parameters, the determined set of power control parameters including the first set of power control parameters or the second set of power control parameters.

In some examples, the determined set of power control parameters is the second set of power control parameters based on each TCI state of the set of TCI states corresponding to a respective subset of power control parameters included in the second set of power control parameters. In some examples, the determined set of power control parameters is the first set of power control parameters based on the set of resources for transmitting the reference signals corresponding to a set of power control parameters.

In some examples, the reference signal component 1035 may be configured as or otherwise support a means for outputting a third message indicating that the set of resources for transmitting the reference signals are configured for a beam management procedure, where the determined set of power control parameters is the first set of power control parameters based on outputting the third message.

In some examples, the reference signal component 1035 may be configured as or otherwise support a means for outputting a third message indicating that the set of resources for transmitting the reference signals are configured for codebook or non-codebook transmissions, where the determined set of power control parameters is the second set of power control parameters based on outputting the third message.

In some examples, the third configuration component 1040 may be configured as or otherwise support a means for outputting a third message indicating a third configuration for the reference signals to be transmitted according to the first set of power control parameters or the second set of power control parameters, where obtaining the reference signals in accordance with the determined set of power control parameters is based on the third configuration.

In some examples, the third configuration component 1040 may be configured as or otherwise support a means for outputting a fourth message indicating an update to the third configuration, where obtaining the reference signals in accordance with the determined set of power control parameters is further based on the update to the third configuration. In some examples, the third message is an RRC message and the fourth message is a DCI message or a MAC-CE.

In some examples, the reference signal component 1035 may be configured as or otherwise support a means for outputting a third message indicating a default configuration for transmitting the reference signals, where the default configuration indicates for the reference signals to be transmitted in accordance with the first set of power control parameters or the second set of power control parameters, and where obtaining the reference signals in accordance with the determined set of power control parameters is based on outputting the third message.

In some examples, the first configuration further includes a fourth indication of a set of multiple subsets of power control parameters. In some examples, each subset of the set of multiple subsets corresponds to a resource of the set of resources. In some examples, the first set of power control parameters is a common set of power control parameters corresponding to each resource of the set of resources.

In some examples, the report component 1045 may be configured as or otherwise support a means for obtaining a report indicating at least one UE capability associated with controlling a transmit power at a UE, where outputting the first message, the second message, or both, is based on the at least one UE capability.

In some examples, the at least one UE capability includes a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

Figure 11:
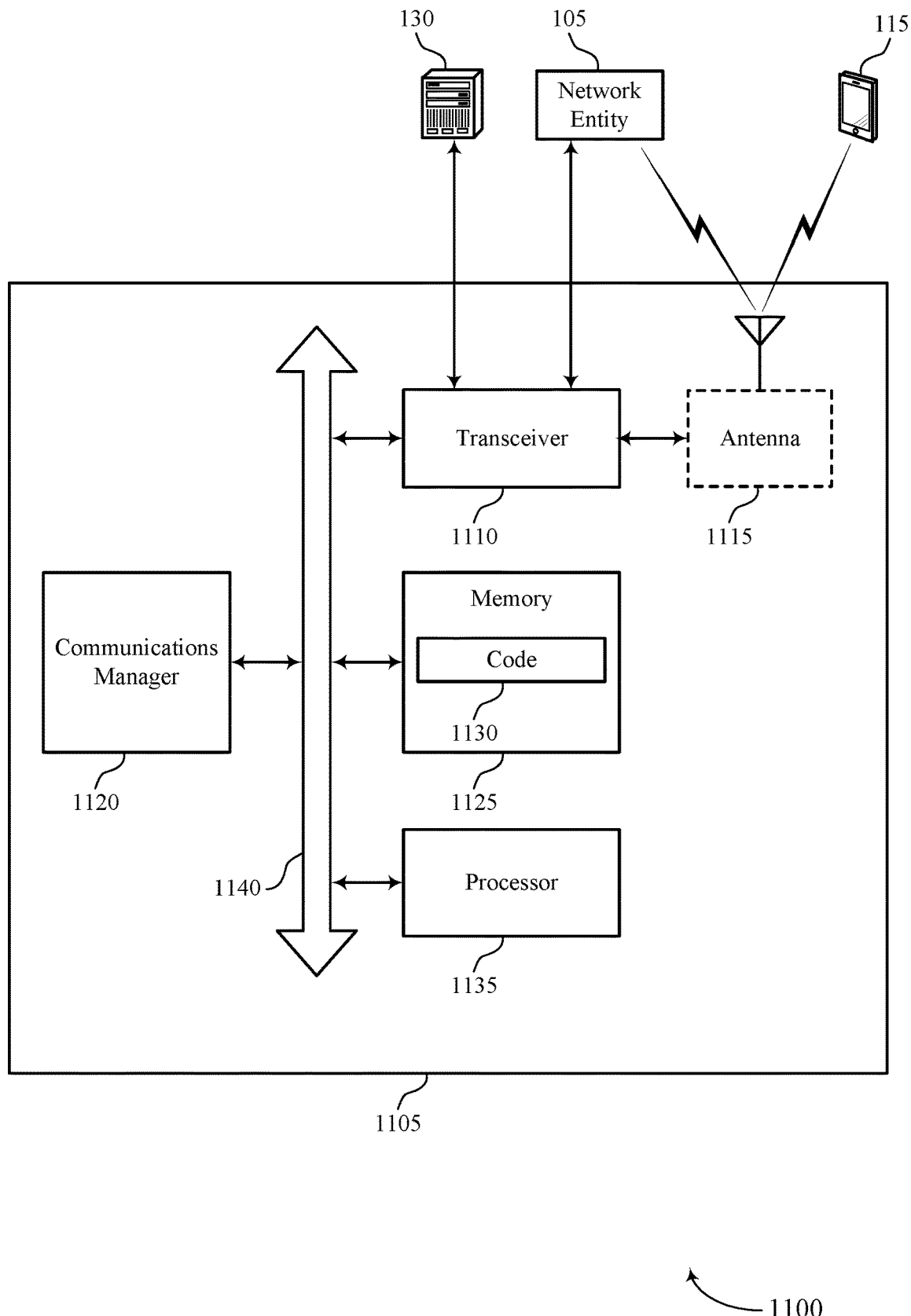
FIG. 11 shows a diagram of a system including a device that supports techniques for flexible configuration of power control parameters in accordance with various aspects of the present disclosure

FIG. 11 shows a diagram of a system 1100 including a device 1105 that supports techniques for flexible configuration of power control parameters in accordance with various aspects of the present disclosure. The device 1105 may be an example of or include the components of a device 805, a device 905, or a network entity 105 as shown in FIG. 1. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communication links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for flexible configuration of power control parameters). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity (e.g., the device 1105) in accordance with examples as disclosed herein. For example, the communications manager 1120 may be configured as or otherwise support a means for outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The communications manager 1120 may be configured as or otherwise support a means for outputting a second message indicating a second configuration for the set of TCI states, the second configuration including a third indication of a second set of power control parameters corresponding to the set of TCI states. The communications manager 1120 may be configured as or otherwise support a means for obtaining the reference signals in accordance with a determined set of power control parameters, the determined set of power control parameters including the first set of power control parameters or the second set of power control parameters.

By including or configuring the communications manager 1120 in accordance with examples as described herein, the device 1105 may support techniques for improved communication reliability, improved user experience related to reduced processing, reduced power consumption, and more efficient utilization of communication resources.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for flexible configuration of power control parameters as described herein, or the processor 1135 and the memory 1125 may be otherwise configured to perform or support such operations.

Figure 12:
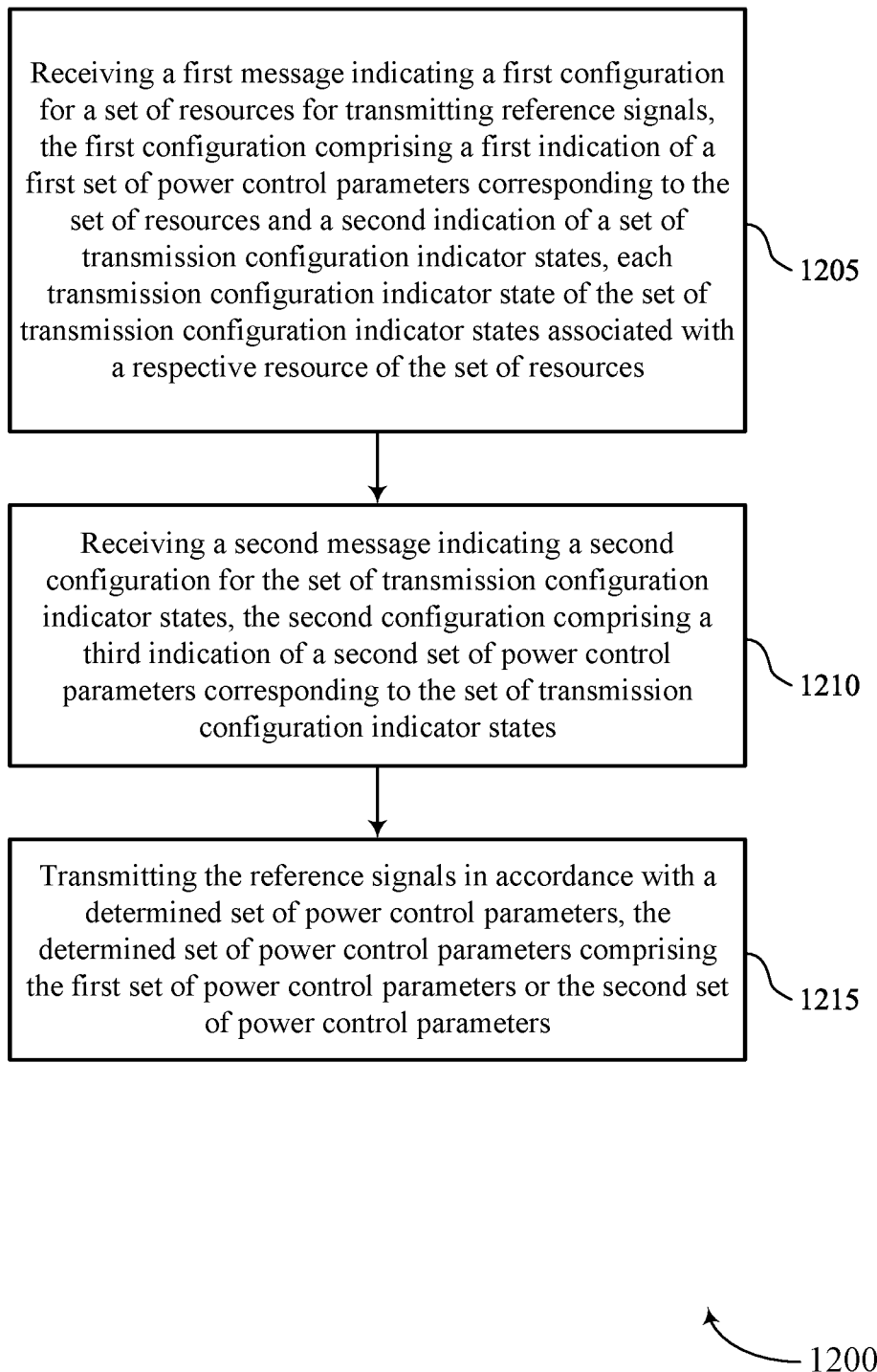
FIGS. 12 through 17 show flowcharts illustrating techniques that support techniques for flexible configuration of power control parameters in accordance with various aspects of the present disclosure

FIG. 12 shows a flowchart illustrating a method 1200 that supports techniques for flexible configuration of power control parameters in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1205 may be performed in accordance with examples as disclosed herein. In some examples, aspects of the operations of 1205 may be performed by a first message component 625 as described with reference to FIG. 6.

At 1210, the method may include receiving a second message indicating a second configuration for the set of TCI states, the second configuration including a third indication of a second set of power control parameters corresponding to the set of TCI states. The operations of 1210 may be performed in accordance with examples as disclosed herein. In some examples, aspects of the operations of 1210 may be performed by a second message component 630 as described with reference to FIG. 6.

At 1215, the method may include transmitting the reference signals in accordance with a determined set of power control parameters, the determined set of power control parameters including the first set of power control parameters or the second set of power control parameters. The operations of 1215 may be performed in accordance with examples as disclosed herein. In some examples, aspects of the operations of 1215 may be performed by a determined power control parameter component 635 as described with reference to FIG. 6.

Figure 13:
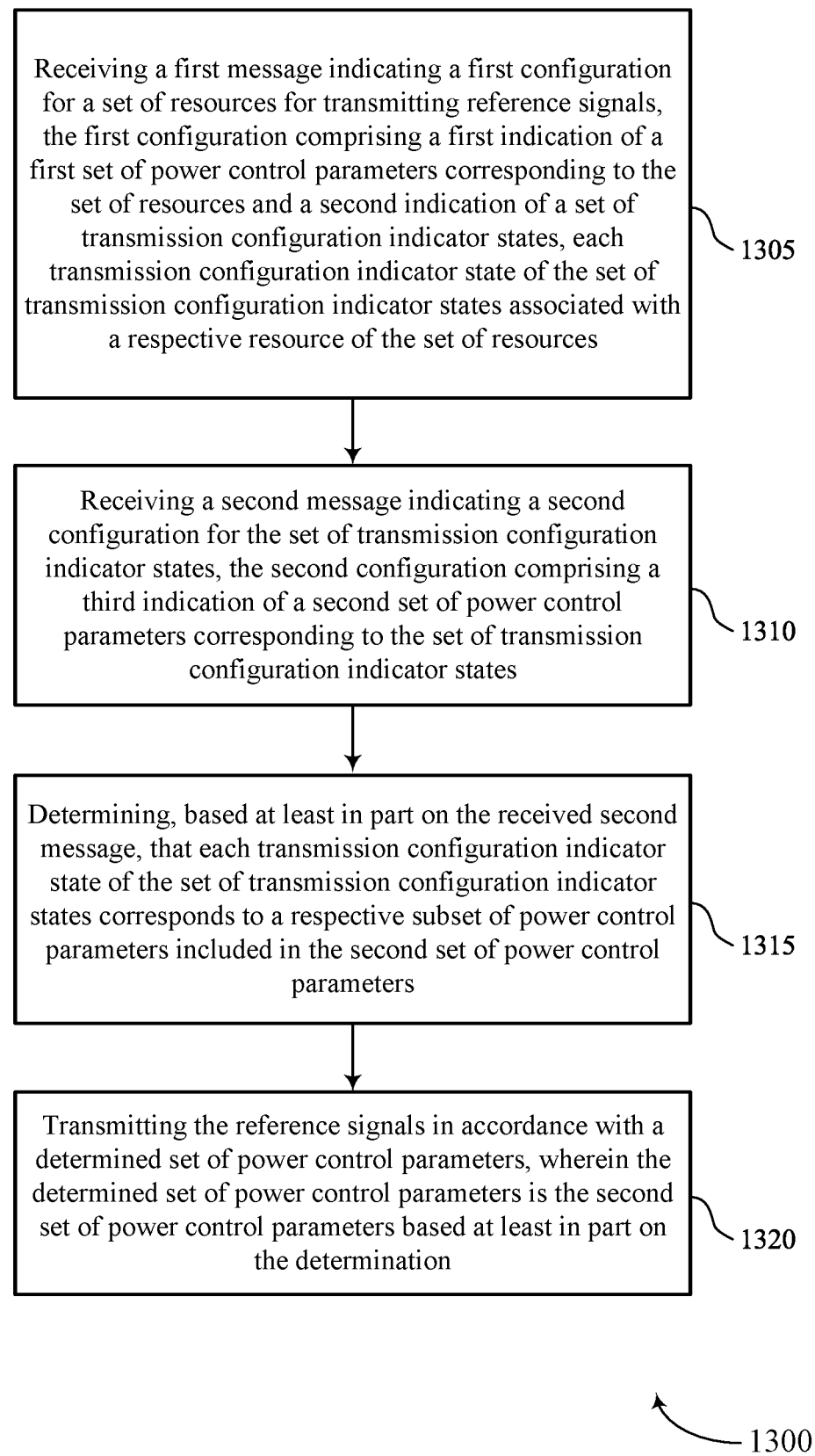

FIG. 13 shows a flowchart illustrating a method 1300 that supports techniques for flexible configuration of power control parameters in accordance with various aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1305 may be performed in accordance with examples as disclosed herein. In some examples, aspects of the operations of 1305 may be performed by a first message component 625 as described with reference to FIG. 6.

At 1310, the method may include receiving a second message indicating a second configuration for the set of TCI states, the second configuration including a third indication of a second set of power control parameters corresponding to the set of TCI states. The operations of 1310 may be performed in accordance with examples as disclosed herein. In some examples, aspects of the operations of 1310 may be performed by a second message component 630 as described with reference to FIG. 6.

At 1315, the method may include determining, based on the received second message, that each TCI state of the set of TCI states corresponds to a respective subset of power control parameters included in the second set of power control parameters. The operations of 1315 may be performed in accordance with examples as disclosed herein. In some examples, aspects of the operations of 1315 may be performed by a second message component 630 as described with reference to FIG. 6.

At 1320, the method may include transmitting the reference signals in accordance with a determined set of power control parameters, where the determined set of power control parameters is the second set of power control parameters based on the determination. The operations of 1320 may be performed in accordance with examples as disclosed herein. In some examples, aspects of the operations of 1320 may be performed by a determined power control parameter component 635 as described with reference to FIG. 6.

Figure 14:
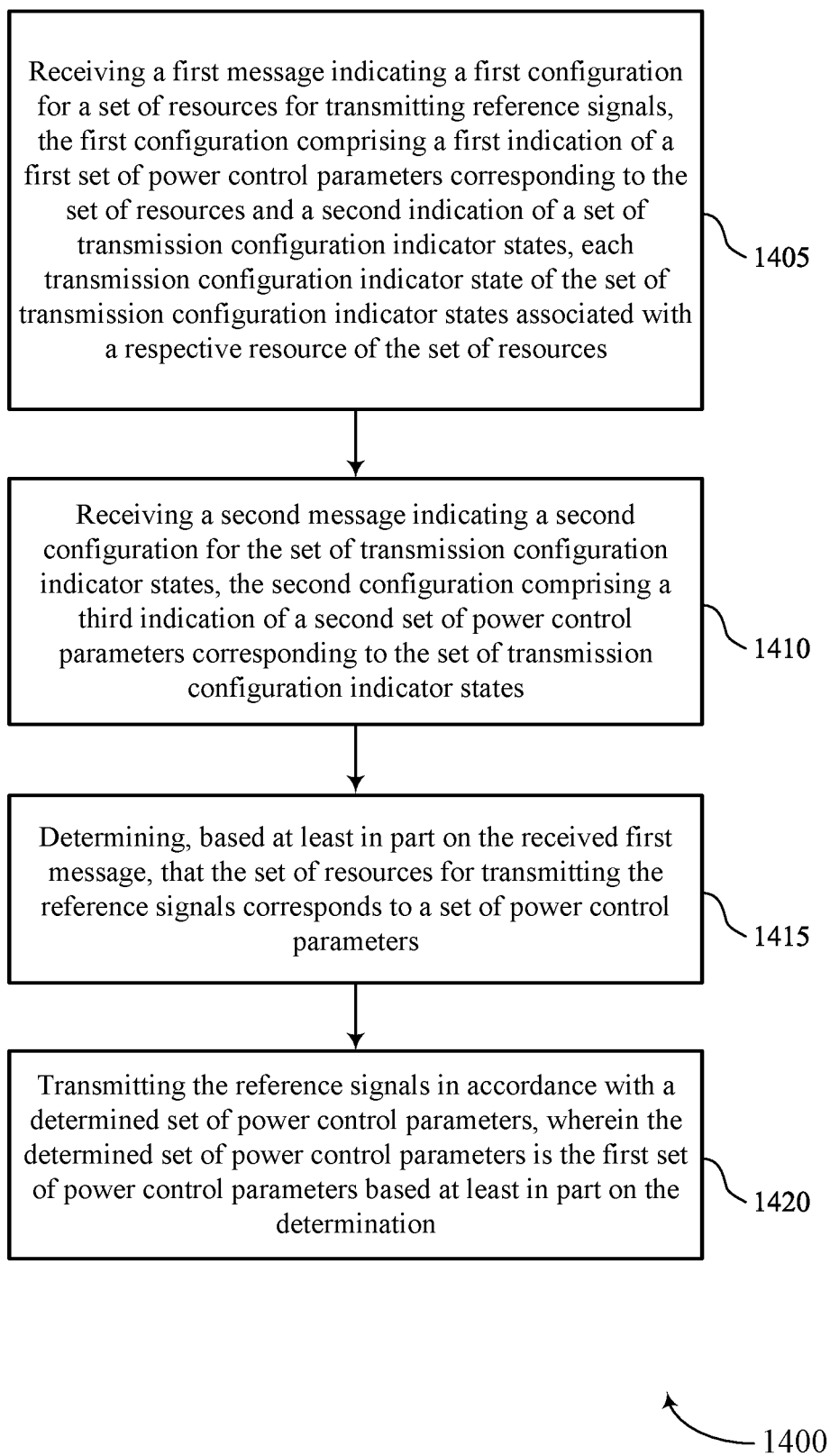

FIG. 14 shows a flowchart illustrating a method 1400 that supports techniques for flexible configuration of power control parameters in accordance with various aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1405 may be performed in accordance with examples as disclosed herein. In some examples, aspects of the operations of 1405 may be performed by a first message component 625 as described with reference to FIG. 6.

At 1410, the method may include receiving a second message indicating a second configuration for the set of TCI states, the second configuration including a third indication of a second set of power control parameters corresponding to the set of TCI states. The operations of 1410 may be performed in accordance with examples as disclosed herein. In some examples, aspects of the operations of 1410 may be performed by a second message component 630 as described with reference to FIG. 6.

At 1415, the method may include determining, based on the received first message, that the set of resources for transmitting the reference signals corresponds to a set of power control parameters. The operations of 1415 may be performed in accordance with examples as disclosed herein. In some examples, aspects of the operations of 1415 may be performed by a first message component 625 as described with reference to FIG. 6.

At 1420, the method may include transmitting the reference signals in accordance with a determined set of power control parameters, where the determined set of power control parameters is the first set of power control parameters based on the determination. The operations of 1420 may be performed in accordance with examples as disclosed herein. In some examples, aspects of the operations of 1420 may be performed by a determined power control parameter component 635 as described with reference to FIG. 6.

Figure 15:
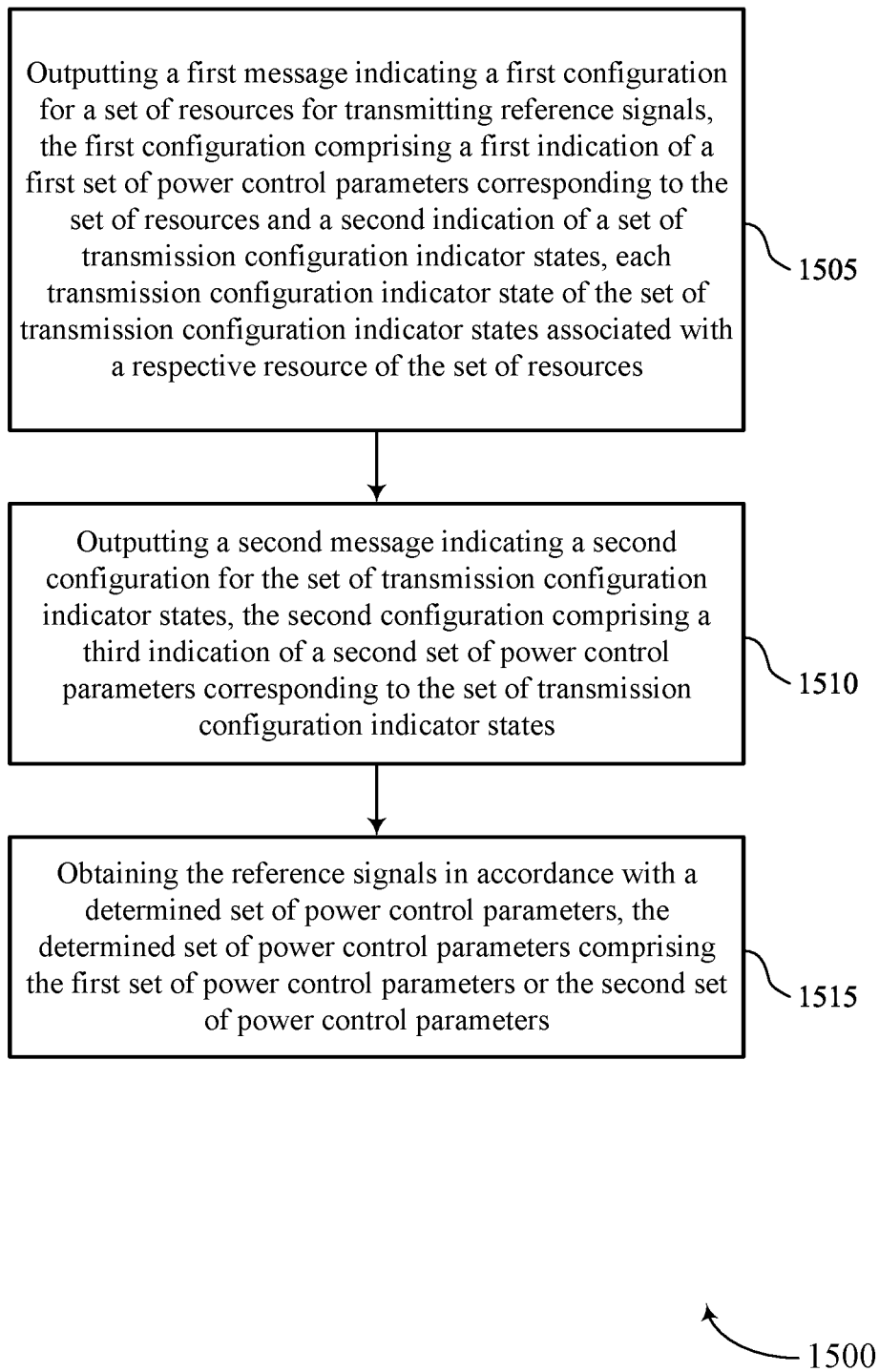

FIG. 15 shows a flowchart illustrating a method 1500 that supports techniques for flexible configuration of power control parameters in accordance with various aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1505 may be performed in accordance with examples as disclosed herein. In some examples, aspects of the operations of 1505 may be performed by a first configuration component 1025 as described with reference to FIG. 10.

At 1510, the method may include outputting a second message indicating a second configuration for the set of TCI states, the second configuration including a third indication of a second set of power control parameters corresponding to the set of TCI states. The operations of 1510 may be performed in accordance with examples as disclosed herein. In some examples, aspects of the operations of 1510 may be performed by a second configuration component 1030 as described with reference to FIG. 10.

At 1515, the method may include obtaining the reference signals in accordance with a determined set of power control parameters, the determined set of power control parameters including the first set of power control parameters or the second set of power control parameters. The operations of 1515 may be performed in accordance with examples as disclosed herein. In some examples, aspects of the operations of 1515 may be performed by a reference signal component 1035 as described with reference to FIG. 10.

Figure 16:
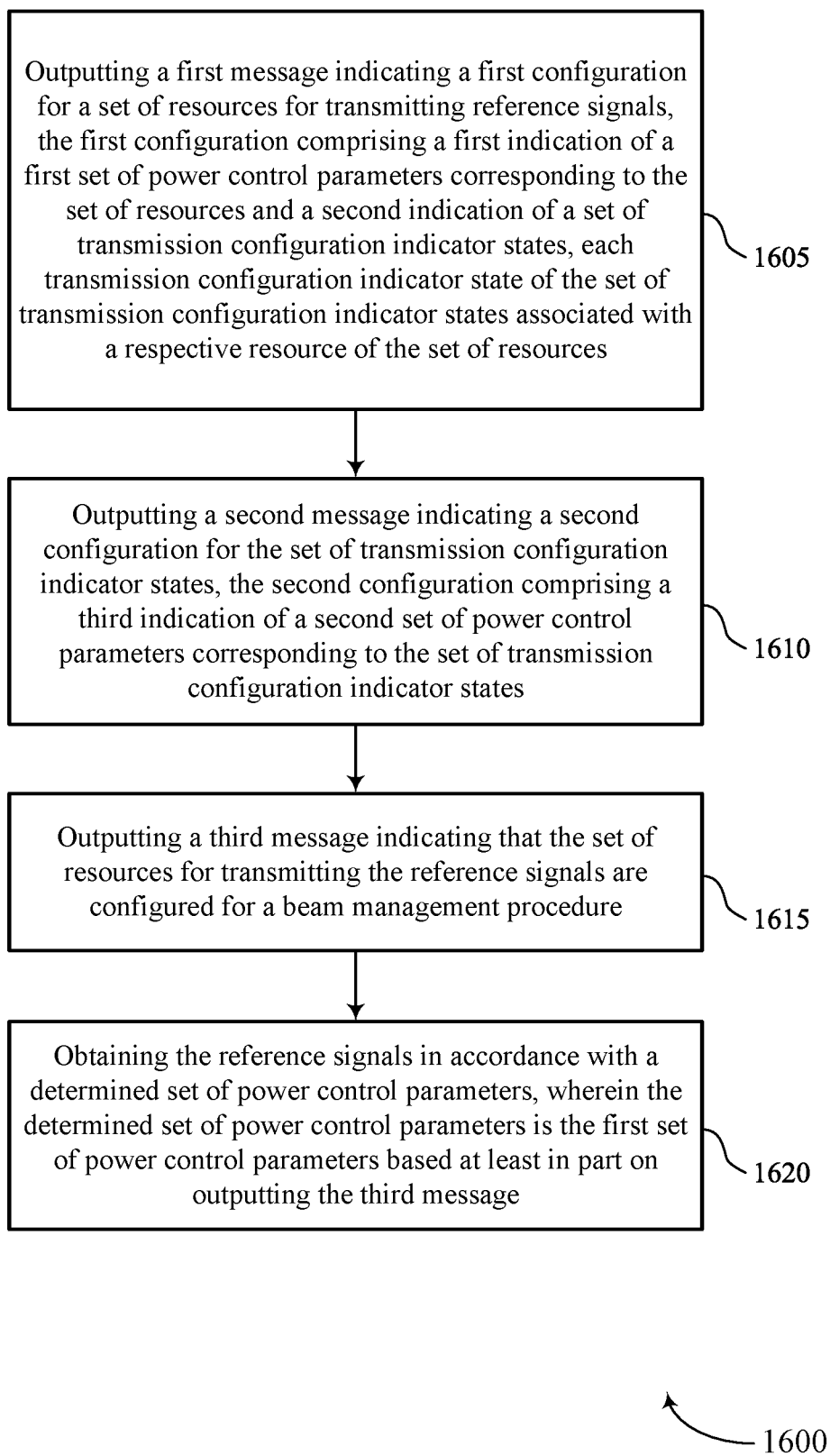

FIG. 16 shows a flowchart illustrating a method 1600 that supports techniques for flexible configuration of power control parameters in accordance with various aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1605 may be performed in accordance with examples as disclosed herein. In some examples, aspects of the operations of 1605 may be performed by a first configuration component 1025 as described with reference to FIG. 10.

At 1610, the method may include outputting a second message indicating a second configuration for the set of TCI states, the second configuration including a third indication of a second set of power control parameters corresponding to the set of TCI states. The operations of 1610 may be performed in accordance with examples as disclosed herein. In some examples, aspects of the operations of 1610 may be performed by a second configuration component 1030 as described with reference to FIG. 10.

At 1615, the method may include outputting a third message indicating that the set of resources for transmitting the reference signals are configured for a beam management procedure. The operations of 1615 may be performed in accordance with examples as disclosed herein. In some examples, aspects of the operations of 1615 may be performed by a reference signal component 1035 as described with reference to FIG. 10.

At 1620, the method may include obtaining the reference signals in accordance with a determined set of power control parameters, where the determined set of power control parameters is the first set of power control parameters based on outputting the third message. The operations of 1620 may be performed in accordance with examples as disclosed herein. In some examples, aspects of the operations of 1620 may be performed by a reference signal component 1035 as described with reference to FIG. 10.

Figure 17:
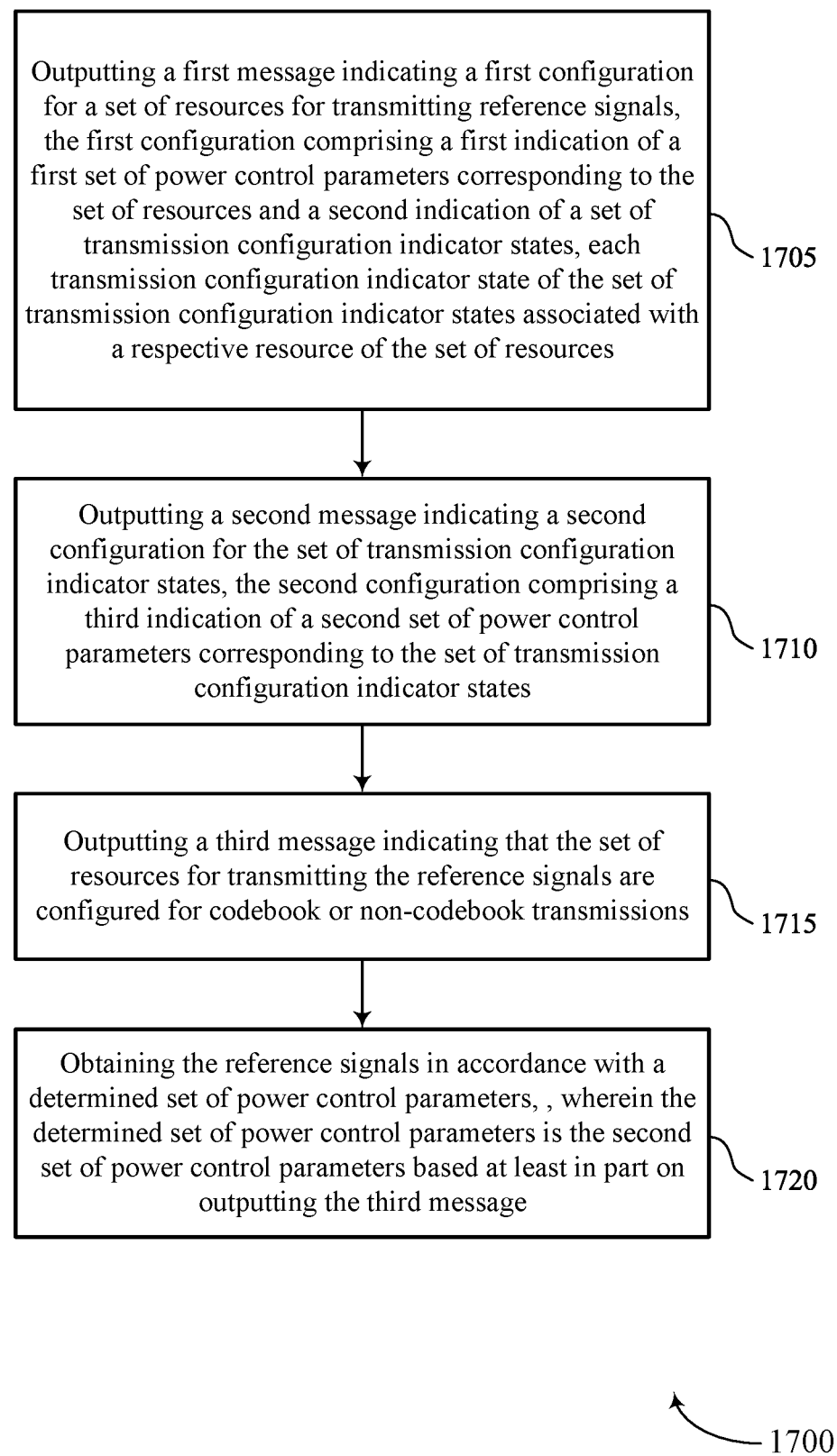

FIG. 17 shows a flowchart illustrating a method 1700 that supports techniques for flexible configuration of power control parameters in accordance with various aspects of the present disclosure. The operations of the method 1700 may be implemented by a network entity or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1705, the method may include outputting a first message indicating a first configuration for a set of resources for transmitting reference signals, the first configuration including a first indication of a first set of power control parameters corresponding to the set of resources and a second indication of a set of TCI states, each TCI state of the set of TCI states associated with a respective resource of the set of resources. The operations of 1705 may be performed in accordance with examples as disclosed herein. In some examples, aspects of the operations of 1705 may be performed by a first configuration component 1025 as described with reference to FIG. 10.

At 1710, the method may include outputting a second message indicating a second configuration for the set of TCI states, the second configuration including a third indication of a second set of power control parameters corresponding to the set of TCI states. The operations of 1710 may be performed in accordance with examples as disclosed herein. In some examples, aspects of the operations of 1710 may be performed by a second configuration component 1030 as described with reference to FIG. 10.

At 1715, the method may include outputting a third message indicating that the set of resources for transmitting the reference signals are configured for codebook or non-codebook transmissions. The operations of 1715 may be performed in accordance with examples as disclosed herein. In some examples, aspects of the operations of 1715 may be performed by a reference signal component 1035 as described with reference to FIG. 10.

At 1720, the method may include obtaining the reference signals in accordance with a determined set of power control parameters, where the determined set of power control parameters is the second set of power control parameters based on outputting the third message. The operations of 1720 may be performed in accordance with examples as disclosed herein. In some examples, aspects of the operations of 1720 may be performed by a reference signal component 1035 as described with reference to FIG. 10.

The following provides an overview of aspects of the present disclosure:

Aspect 1: A method for wireless communication at a UE, comprising: receiving a first message indicating a first configuration for a set of resources for transmitting reference signals, the first configuration comprising a first indication of a first set of power control parameters corresponding to the set of resources and a second indication of a set of TCI states, each TCI state of the set of TCI states associated with a respective resource of the set of resources; receiving a second message indicating a second configuration for the set of TCI states, the second configuration comprising a third indication of a second set of power control parameters corresponding to the set of TCI states; and transmitting the reference signals in accordance with a determined set of power control parameters, the determined set of power control parameters comprising the first set of power control parameters or the second set of power control parameters.

Aspect 2: The method of aspect 1, further comprising: determining, based at least in part on the received second message, that each TCI state of the set of TCI states corresponds to a respective subset of power control parameters included in the second set of power control parameters, wherein the determined set of power control parameters is the second set of power control parameters based at least in part on the determination.

Aspect 3: The method of aspect 1, further comprising: determining, based at least in part on the received first message, that the set of resources for transmitting the reference signals corresponds to a set of power control parameters, wherein the determined set of power control parameters is the first set of power control parameters based at least in part on the determination.

Aspect 4: The method of aspect 1, further comprising: receiving a third message indicating that the set of resources for transmitting the reference signals are configured for a beam management procedure, wherein the determined set of power control parameters is the first set of power control parameters based at least in part on the received third message.

Aspect 5: The method of aspect 1, further comprising: receiving a third message indicating that the set of resources for transmitting the reference signals are configured for codebook or non-codebook transmissions, wherein the determined set of power control parameters is the second set of power control parameters based at least in part on the received third message.

Aspect 6: The method of aspect 1, further comprising: receiving a third message indicating that the set of TCI states are different from TCI states associated with a set of dedicated resources for transmitting uplink shared channel transmissions; and determining, based at least in part on the received third message, that the second set of power control parameters is a common set of power control parameters corresponding to each resource of the set of resources, wherein the common set of power control parameters is based at least in part on a TCI state associated with a resources of the set of resources for transmitting the reference signals, and wherein the determined set of power control parameters is the second set of power control parameters based at least in part on the determination.

Aspect 7: The method of aspect 6, wherein the common set of power control parameters is further based at least in part on an identifier of the resources of the set of resources.

Aspect 8: The method of any of aspects 1 through 7, further comprising: receiving a third message indicating a third configuration for the UE to transmit the reference signals according to the first set of power control parameters or the second set of power control parameters, wherein transmitting the reference signals in accordance with the determined set of power control parameters is based at least in part on the third configuration.

Aspect 9: The method of aspect 8, further comprising: receiving a fourth message indicating an update to the third configuration, wherein transmitting the reference signals in accordance with the determined set of power control parameters is further based at least in part on the update to the third configuration.

Aspect 10: The method of aspect 9, wherein the third message is an RRC message and the fourth message is a DCI message or a MAC-CE.

Aspect 11: The method of aspect 1, further comprising: identifying a default configuration for transmitting the reference signals, wherein the default configuration indicates for the UE to transmit the reference signals in accordance with the first set of power control parameters or the second set of power control parameters, and wherein transmitting the reference signals in accordance with the determined set of power control parameters is based at least in part on the identified default configuration.

Aspect 12: The method of aspect 11, further comprising: receiving a third message indicating the default configuration for transmitting the reference signals, wherein identifying the default configuration is based at least in part on the received third message.

Aspect 13: The method of aspect 11, wherein the default configuration is configured at the UE.

Aspect 14: The method of any of aspects 1 through 13, wherein the first configuration further comprises a fourth indication of a plurality of subsets of power control parameters, and each subset of the plurality of subsets corresponds to a resource of the set of resources.

Aspect 15: The method of any of aspects 1 through 13, further comprising: determining that the first set of power control parameters is a common set of power control parameters corresponding to each resource of the set of resources, based at least in part on an indication of a subset of power control parameters corresponding to each resource of the set of resources being absent from the first configuration.

Aspect 16: The method of any of aspects 1 through 15, further comprising: transmitting a report indicating at least one UE capability associated with controlling a transmit power at the UE, wherein receiving the first message, the second message, or both, is based at least in part on the at least one UE capability.

Aspect 17: The method of aspect 16, wherein the at least one UE capability comprises a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

Aspect 18: A method for wireless communication at a network entity, comprising: outputting a first message indicating a first configuration for a set of resources for transmitting reference signals, the first configuration comprising a first indication of a first set of power control parameters corresponding to the set of resources and a second indication of a set of TCI states, each TCI state of the set of TCI states associated with a respective resource of the set of resources; outputting a second message indicating a second configuration for the set of TCI states, the second configuration comprising a third indication of a second set of power control parameters corresponding to the set of TCI states; and obtaining the reference signals in accordance with a determined set of power control parameters, the determined set of power control parameters comprising the first set of power control parameters or the second set of power control parameters.

Aspect 19: The method of aspect 18, wherein the determined set of power control parameters is the second set of power control parameters based at least in part on each TCI state of the set of TCI states corresponding to a respective subset of power control parameters included in the second set of power control parameters.

Aspect 20: The method of aspect 18, wherein the determined set of power control parameters is the first set of power control parameters based at least in part on the set of resources for transmitting the reference signals corresponding to a set of power control parameters.

Aspect 21: The method of aspect 18, further comprising: outputting a third message indicating that the set of resources for transmitting the reference signals are configured for a beam management procedure, wherein the determined set of power control parameters is the first set of power control parameters based at least in part on outputting the third message.

Aspect 22: The method of aspect 18, further comprising: outputting a third message indicating that the set of resources for transmitting the reference signals are configured for codebook or non-codebook transmissions, wherein the determined set of power control parameters is the second set of power control parameters based at least in part on outputting the third message.

Aspect 23: The method of any of aspects 18 through 22, further comprising: outputting a third message indicating a third configuration for the reference signals to be transmitted according to the first set of power control parameters or the second set of power control parameters, wherein obtaining the reference signals in accordance with the determined set of power control parameters is based at least in part on the third configuration.

Aspect 24: The method of aspect 23, further comprising: outputting a fourth message indicating an update to the third configuration, wherein obtaining the reference signals in accordance with the determined set of power control parameters is further based at least in part on the update to the third configuration.

Aspect 25: The method of aspect 24, wherein the third message is an RRC message and the fourth message is a DCI message or a MAC-CE.

Aspect 26: The method of aspect 18, further comprising: outputting a third message indicating a default configuration for transmitting the reference signals, wherein the default configuration indicates for the reference signals to be transmitted in accordance with the first set of power control parameters or the second set of power control parameters, and wherein obtaining the reference signals in accordance with the determined set of power control parameters is based at least in part on outputting the third message.

Aspect 27: The method of any of aspects 18 through 26, wherein the first configuration further comprises a fourth indication of a plurality of subsets of power control parameters, and each subset of the plurality of subsets corresponds to a resource of the set of resources.

Aspect 28: The method of any of aspects 18 through 26, wherein the first set of power control parameters is a common set of power control parameters corresponding to each resource of the set of resources.

Aspect 29: The method of any of aspects 18 through 28, further comprising: obtaining a report indicating at least one UE capability associated with controlling a transmit power at a UE, wherein outputting the first message, the second message, or both, is based at least in part on the at least one UE capability.

Aspect 30: The method of aspect 29, wherein the at least one UE capability comprises a capability of the UE to be configured with the first set of power control parameters corresponding to the set of resources, a capability of the UE to be configured with the second set of power control parameters corresponding to the set of TCI states, a capability of the UE to be dynamically configured with a set of power control parameters, a capability of the UE to determine a set of power control parameters according to a usage for the reference signals, or any combination thereof.

Aspect 31: An apparatus for wireless communication at a UE, comprising a processor; memory coupled with the processor; and instructions stored in the memory and executable by the processor to cause the apparatus to perform a method of any of aspects 1 through 17.

Aspect 32: An apparatus for wireless communication at a UE, comprising at least one means for performing a method of any of aspects 1 through 17.

Aspect 33: A non-transitory computer-readable medium storing code for wireless communication at a UE, the code comprising instructions executable by a processor to perform a method of any of aspects 1 through 17.

Aspect 34: An apparatus for wireless communication at a network entity, comprising a processor; memory coupled with the processor; and instructions stored in the memory and executable by the processor to cause the apparatus to perform a method of any of aspects 18 through 30.

Aspect 35: An apparatus for wireless communication at a network entity, comprising at least one means for performing a method of any of aspects 18 through 30.

Aspect 36: A non-transitory computer-readable medium storing code for wireless communication at a network entity, the code comprising instructions executable by a processor to perform a method of any of aspects 18 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a UE capability report indicating a capability of the UE to support application of different sets of power control parameters to respective resources of a set of resources used to transmit reference signals;
   receiving a first message indicating a first configuration for the set of resources to use to transmit the reference signals, the first configuration comprising a first indication of a first set of power control parameters corresponding to the set of resources and a second indication of a set of transmission configuration indicator states, each transmission configuration indicator state of the set of transmission configuration indicator states associated with a respective resource of the set of resources, the first set of power control parameters being applied to a first respective resource associated with a first transmission configuration indicator state of the set of transmission configuration indicator states;
   receiving a second message indicating a second configuration for the set of transmission configuration indicator states, the second configuration comprising a third indication of a second set of power control parameters corresponding to the set of transmission configuration indicator states, the second set of power control parameters being applied to a second respective resource of the set of resources associated with the first transmission configuration indicator state of the set of transmission configuration indicator states; and
   transmitting the reference signals in accordance with a determined set of power control parameters comprising the first set of power control parameters or the second set of power control parameters, wherein selection of the determined set of power control parameters is in accordance with the capability of the UE.

2. The method of claim 1, further comprising:
   determining, based at least in part on the received second message, that each transmission configuration indicator state of the set of transmission configuration indicator states corresponds to a respective subset of power control parameters included in the second set of power control parameters, wherein the determined set of power control parameters is the second set of power control parameters based at least in part on the determination.

3. The method of claim 1, further comprising:
   determining, based at least in part on the received first message, that the set of resources to use to transmit the reference signals corresponds to a set of power control parameters, wherein the determined set of power control parameters is the first set of power control parameters based at least in part on the determination.

4. The method of claim 1, further comprising:
receiving a third message indicating that the set of resources to use to transmit the reference signals are configured for a beam management procedure, wherein the determined set of power control parameters is the first set of power control parameters based at least in part on the received third message.

5. The method of claim 1, further comprising:
receiving a third message indicating that the set of resources to use to transmit the reference signals are configured for codebook or non-codebook transmissions, wherein the determined set of power control parameters is the second set of power control parameters based at least in part on the received third message.

6. The method of claim 1, further comprising:
receiving a third message indicating that the set of transmission configuration indicator states are different from transmission configuration indicator states associated with a set of dedicated resources to use to transmit uplink shared channel transmissions; and
determining, based at least in part on the received third message, that the second set of power control parameters is a common set of power control parameters corresponding to each resource of the set of resources, wherein the common set of power control parameters is based at least in part on a transmission configuration indicator state associated with a resources of the set of resources to use to transmit the reference signals, and wherein the determined set of power control parameters is the second set of power control parameters based at least in part on the determination.

7. The method of claim 6, wherein the common set of power control parameters is further based at least in part on an identifier of the resources of the set of resources.

8. The method of claim 1, further comprising:
receiving a third message indicating a third configuration to use to transmit the reference signals according to the first set of power control parameters or the second set of power control parameters, wherein transmitting the reference signals in accordance with the determined set of power control parameters is based at least in part on the third configuration.

9. The method of claim 8, further comprising:
receiving a fourth message indicating an update to the third configuration, wherein transmitting the reference signals in accordance with the determined set of power control parameters is further based at least in part on the update to the third configuration.

10. The method of claim 1, further comprising:
identifying a default configuration to use to transmit the reference signals, wherein the default configuration indicates transmission of the reference signals in accordance with the first set of power control parameters or the second set of power control parameters, and wherein transmitting the reference signals in accordance with the determined set of power control parameters is based at least in part on the identified default configuration.

11. The method of claim 10, further comprising:
receiving a third message indicating the default configuration to use to transmit the reference signals, wherein identifying the default configuration is based at least in part on the received third message.

12. The method of claim 1, wherein the first configuration further comprises a fourth indication of a plurality of subsets of power control parameters, and each subset of the plurality of subsets corresponds to a resource of the set of resources.

13. The method of claim 1, further comprising:
determining that the first set of power control parameters is a common set of power control parameters corresponding to each resource of the set of resources, based at least in part on an indication of a subset of power control parameters corresponding to each resource of the set of resources being absent from the first configuration.

14. The method of claim 1,
wherein the UE capability report further indicates at least one UE capability associated with controlling a transmit power at the UE, wherein receiving the first message, the second message, or both, is based at least in part on the at least one UE capability.

15. The method of claim 14, wherein the at least one UE capability comprises a capability of the UE to be configured with the first set of power control parameters corresponding to the set of resources, a capability of the UE to be configured with the second set of power control parameters corresponding to the set of transmission configuration indicator states, a capability of the UE to be dynamically configured with a set of power control parameters, a capability of the UE to determine a set of power control parameters according to a usage for the reference signals, or any combination thereof.

16. A method for wireless communication at a network entity, comprising:
obtaining, from a user equipment (UE), a UE capability report indicating a capability of the UE to support application of different sets of power control parameters to respective resources of a set of resources used to transmit reference signals;
outputting a first message indicating a first configuration for the set of resources for to use to transmit the reference signals, the first configuration comprising a first indication of a first set of power control parameters corresponding to the set of resources and a second indication of a set of transmission configuration indicator states, each transmission configuration indicator state of the set of transmission configuration indicator states associated with a respective resource of the set of resources, the first set of power control parameters being applicable to a first respective resource associated with a first transmission configuration indicator state of the set of transmission configuration indicator states;
outputting a second message indicating a second configuration for the set of transmission configuration indicator states, the second configuration comprising a third indication of a second set of power control parameters corresponding to the set of transmission configuration indicator states, the second set of power control parameters being applicable to a second respective resource of the set of resources associated with the first transmission configuration indicator state of the set of transmission configuration indicator states; and
obtaining the reference signals in accordance with a determined set of power control parameters comprising the first set of power control parameters or the second set of power control parameters, wherein selection of the determined set of power control parameters is in accordance with the capability of the UE.

17. The method of claim 16, wherein the determined set of power control parameters is the second set of power control parameters based at least in part on each transmission configuration indicator state of the set of transmission configuration indicator states corresponding to a respective subset of power control parameters included in the second set of power control parameters.

18. The method of claim 16, wherein the determined set of power control parameters is the first set of power control parameters based at least in part on the set of resources to use to transmit the reference signals corresponding to a set of power control parameters.

19. The method of claim 16, further comprising:
outputting a third message indicating that the set of resources to use to transmit the reference signals are configured for a beam management procedure, wherein the determined set of power control parameters is the first set of power control parameters based at least in part on outputting the third message.

20. The method of claim 16, further comprising:
outputting a third message indicating that the set of resources to use to transmit the reference signals are configured for codebook or non-codebook transmissions, wherein the determined set of power control parameters is the second set of power control parameters based at least in part on outputting the third message.

21. The method of claim 16, further comprising:
outputting a third message indicating a third configuration to use to transmit the reference signals according to the first set of power control parameters or the second set of power control parameters, wherein obtaining the reference signals in accordance with the determined set of power control parameters is based at least in part on the third configuration.

22. The method of claim 21, further comprising:
outputting a fourth message indicating an update to the third configuration, wherein obtaining the reference signals in accordance with the determined set of power control parameters is further based at least in part on the update to the third configuration.

23. The method of claim 22, wherein the third message is a radio resource control message and the fourth message is a downlink control information message or a medium access control control element.

24. The method of claim 16, further comprising:
outputting a third message indicating a default configuration to use to transmit the reference signals, wherein the default configuration indicates the reference signals are to be transmitted in accordance with the first set of power control parameters or the second set of power control parameters, and wherein obtaining the reference signals in accordance with the determined set of power control parameters is based at least in part on outputting the third message.

25. The method of claim 16, wherein the first configuration further comprises a fourth indication of a plurality of subsets of power control parameters, and each subset of the plurality of subsets corresponds to a resource of the set of resources.

26. The method of claim 16, wherein the first set of power control parameters is a common set of power control parameters corresponding to each resource of the set of resources.

27. The method of claim 16,
wherein the UE capability report further indicates at least one UE capability associated with controlling a transmit power at a UE, wherein outputting the first message, the second message, or both, is based at least in part on the at least one UE capability.

28. The method of claim 27, wherein the at least one UE capability comprises a capability of the UE to be configured with the first set of power control parameters corresponding to the set of resources, a capability of the UE to be configured with the second set of power control parameters corresponding to the set of transmission configuration indicator states, a capability of the UE to be dynamically configured with a set of power control parameters, a capability of the UE to determine a set of power control parameters according to a usage for the reference signals, or any combination thereof.

29. An apparatus for wireless communication at a user equipment (UE), comprising:
one or more processors;
one or more memories coupled with the one or more processors; and
instructions stored in the one or more memories and executable by the one or more processors to cause the apparatus to:
transmit a UE capability report indicating a capability of the UE to support application of different sets of power control parameters to respective resources of a set of resources used to transmit reference signals;
receive a first message indicating a first configuration for the set of resources to use to transmit the reference signals, the first configuration comprising a first indication of a first set of power control parameters corresponding to the set of resources and a second indication of a set of transmission configuration indicator states, each transmission configuration indicator state of the set of transmission configuration indicator states associated with a respective resource of the set of resources, the first set of power control parameters being applied to a first respective resource associated with a first transmission configuration indicator state of the set of transmission configuration indicator states;
receive a second message indicating a second configuration for the set of transmission configuration indicator states, the second configuration comprising a third indication of a second set of power control parameters corresponding to the set of transmission configuration indicator states, the second set of power control parameters being applied to a second respective resource of the set of resources associated with the first transmission configuration indicator state of the set of transmission configuration indicator states; and
transmit the reference signals in accordance with a determined set of power control parameters comprising the first set of power control parameters or the second set of power control parameters, wherein selection of the determined set of power control parameters is in accordance with the capability of the UE.

30. An apparatus for wireless communication at a network entity, comprising:
one or more processors;
one or more memories coupled with the one or more processors; and
instructions stored in the one or more memories and executable by the one or more processors to cause the apparatus to:
obtaining, from a user equipment (UE), a UE capability report indicating a capability of the UE to support application of different sets of power control parameters to respective resources of a set of resources used to transmit reference signals;

output a first message indicating a first configuration for the set of resources to use to transmit the reference signals, the first configuration comprising a first indication of a first set of power control parameters corresponding to the set of resources and a second indication of a set of transmission configuration indicator states, each transmission configuration indicator state of the set of transmission configuration indicator states associated with a respective resource of the set of resources, the first set of power control parameters being applicable to a first respective resource associated with a first transmission configuration indicator state of the set of transmission configuration indicator states;

output a second message indicating a second configuration for the set of transmission configuration indicator states, the second configuration comprising a third indication of a second set of power control parameters corresponding to the set of transmission configuration indicator states, the second set of power control parameters being applicable to a second respective resource of the set of resources associated with the first transmission configuration indicator state of the set of transmission configuration indicator states; and obtain the reference signals in accordance with a determined set of power control parameters comprising the first set of power control parameters or the second set of power control parameters, wherein selection of the determined set of power control parameters is in accordance with the capability of the UE.

* * * * *